(12) United States Patent
Thompson et al.

(10) Patent No.: US 8,819,130 B2
(45) Date of Patent: Aug. 26, 2014

(54) SYSTEM AND METHOD FOR GROUP TO GROUP ENTERTAINMENT

(75) Inventors: Bejamin Stuart Thompson, Beverly Hills, CA (US); Ella Belzberg Thompson, Beverly Hills, CA (US)

(73) Assignees: Benjamin Stuart Thompson, Beverly Hills, CA (US); Ella Belzberg Thompson, Beverly Hills, CA (US)

( * ) Notice: Subject to any disclaimer, the term of this patent is extended or adjusted under 35 U.S.C. 154(b) by 1552 days.

(21) Appl. No.: 11/619,157

(22) Filed: Jan. 2, 2007

(65) Prior Publication Data

US 2007/0156883 A1    Jul. 5, 2007

Related U.S. Application Data

(60) Provisional application No. 60/755,514, filed on Dec. 30, 2005.

(51) Int. Cl.
*G06F 15/18* (2006.01)
*G06Q 10/10* (2012.01)
*H04L 12/18* (2006.01)
*H04N 21/414* (2011.01)

(52) U.S. Cl.
CPC ............ *G06Q 10/10* (2013.01); *H04L 12/1822* (2013.01); *H04N 21/41415* (2013.01); *A63F 2300/8023* (2013.01)
USPC ......................................................... 709/204

(58) Field of Classification Search
CPC ................. H04L 12/1822; A63F 2300/8023; H04N 21/41415
USPC .............. 709/204; 463/42, 7; 348/157; 725/5
See application file for complete search history.

(56) References Cited

U.S. PATENT DOCUMENTS

| | | | | |
|---|---|---|---|---|
| 5,993,314 A  * | 11/1999 | Dannenberg et al. | ............. | 463/1 |
| 6,620,043 B1 * | 9/2003 | Haseltine et al. | ................. | 463/7 |
| 6,669,346 B2 * | 12/2003 | Metcalf | ............................ | 353/94 |
| 7,113,169 B2 * | 9/2006 | Gnanamgari et al. | ......... | 345/158 |
| 7,231,650 B1 * | 6/2007 | Pinera et al. | ....................... | 725/1 |
| 2003/0224856 A1* | 12/2003 | Bukovsky et al. | .............. | 463/42 |

OTHER PUBLICATIONS

Maynes-Aminzade et al. Techniqes for Interactive Audience Participation pp. 1-7, 2002.*

* cited by examiner

*Primary Examiner* — Larry Donaghue
(74) *Attorney, Agent, or Firm* — Kleinberg & Lerner, LLP; Marvin H. Kleinberg; Marshall A. Lerner

(57) ABSTRACT

A hardware and software platform for collaboratively reviewing prior group to group interactions while planning, producing and archiving new group to group interactions. The platform may be used to collaboratively create group to group interactions. The system may be used to link two or more stadia, movie theatres or homes so as to provide interaction between the groups at each location simultaneously as a game or other event takes place.

24 Claims, 11 Drawing Sheets

SYSTEM AND METHOD FOR GROUP TO GROUP ENTERTAINMENT

CROSS-REFERENCE TO RELATED APPLICATIONS

The present invention claims priority on the basis of U.S. provisional patent application with Ser. No. 60/755,514 filed Dec. 30, 2005 and entitled Group to Group Interface which is incorporated herein in its entirety by reference.

BACKGROUND

1. Field of the Invention

The present invention relates to the organization and enabling of group communication and interaction. More specifically, the invention is a system and method for use of a group to group collaborative interface to develop, produce and research "upstream/downstream" media models for multiple site games and/or events through use of a production platform for group to group collaborative media interaction.

2. Description of the Related Art

There exist other systems and methods in the prior art whereby individuals and small groups may communicate and interact with each other. Systems and methods of the prior art include video conferencing devices, television and radio "audience call-in" shows and internet streaming broadcasts.

Broadcast media such as radio, television and internet streaming have been used, for example, to broaden the audience for sporting events beyond the site of an actual game, and to widely share news and events.

The systems and methods employed by these forms of communication are well-known in the art. A constant problem that has been cited in large-scale communications such as these is the great limitation of interactivity and specifically the lack of a recognized standard for organized group collaboration in the media and/or in an on-going event. Any individual or group of users are, typically, unable to interact effectively or significantly with the broadcast media of the prior art.

Modern systems, especially systems using the internet as the primary means of communication, have enabled more interactivity. One example of such a system is the video conference. Other examples include Internet Relay Chat (IRC), instant messaging (IM), email, multi-user video games and voice over internet protocol software such as the Skype® telephony service. Other high end video videoconference systems, such as Cisco's Telepresence, among other systems and methods, typically employ a primary means of interaction. In the case of video conferencing, video in conjunction with sound is typically employed for, at best, small groups which have self organized for potential collaborative. In the case of IRC, text, typed in by the users is the primary means of interaction.

In the case of a multi-user video game, the game program may include "team speak" in which users are able to hear and speak to one another "in-game." Other multi-user games have the capacity to employ custom-made avatars or video cameras to add individualized visualizations to a group interaction, such as the virtual web-enabled environment known as Second Life.

The interactivity of these prior art systems and methods is typically relegated to use by single individuals or small groups in each of many sites, speaking or typing into a channel or closed communications loop as they operate a customized avatar. This is also the case with even "massive multi-player" online games, in which thousands of individuals may be collectively engaged in the same game. These "massive multi-player" games are configured for individual play or for play in small groups, currently with an upper limit of two groups of approximately of forty competing in predefined programmed "in-game" activities, such as group raids.

In view of this kind of limitation on group collaboration, the enabling of two-way communication between individuals that allow them to form themselves into a collaborative media production group, is a substantial step forward. In addition, the ability for multiple users on a large scale to schedule, plan collaboratively, interact in advance and take part in a wide variety of rich media interaction across multiple sites simultaneously has not been previously available. Furthermore, the prior art methods of video conferencing do not employ large group to large group models of use, as opposed to individual to group, or small group to small group interaction in any meaningful way.

For these reasons, there exists a need. The prior art provides systems and methods of communication between individuals and small groups. The prior art provides systems and methods whereby individuals or small groups may interact, influence and cause or direct actions and events to occur in locations remote from themselves. However, the prior art does not teach any system whereby, in advance of an upcoming event, entire groups of participants may extensively collaborate to develop an event plan. Furthermore, the prior art does not teach groups continuously or asynchronously interacting to realize that plan. Ultimately groups are able to interact simultaneously with other groups to thereby collectively take part in two or more group games or activities. Such groups may share interaction in an event across multiple sites, as all participating groups experience the event via rich two-way media.

SUMMARY OF THE INVENTION

The invention provides a system and method for enabling a group to group interface for "upstream/downstream" collaborative media interaction. The preferred embodiment of the present invention provides numerous benefits over the prior art. Notably, the present invention provides means and systems whereby groups of people may simultaneously or separately collaborate so as to coordinate the activities of a group in advance of an upcoming event. The present invention also allows such groups to be formed by participants who are spread out cross multiple locations, who may interact simultaneously with other groups, large or small, at such events and collaborate effectively afterward to build upon the lessons learned from the impact of the events.

Similarly, the invention provides a means by which groups may develop media and other databases for use in locale versus locale competitions, or other combined efforts. The invention allows groups to influence interaction and to engage other groups in interaction among or between two or more groups in single or multiple sites simultaneously.

This system and method may be described as being a "media cycle" having three principal components: A) the group to group interface as a collaborative engine used before, during and after events; B) the group to group game formats and content models; and C) a group to group production platform.

In the group to group interface, this system and method connects and organizes communication and collective collaboration between and among individuals and groups as they plan or prepare in advance of events, as they engage in those events and as they review and digest them afterward. The present invention is an overarching system and method that may be employed to enable group to group interaction and content for that interaction. The system encompasses one or more of the following: scheduling; collaborative visualization and planning; collective strategy; and event plan execution and subsequent archival storage and use of the group to group interface and event-based interaction for post-production analysis to enable meaningful player feed-back loops.

To facilitate this kind of collaborative organization, the present invention employs, among other capabilities, web-enabled and/or wireless, mobile or hand-held and other computer-aided tool sets and functionalities and their associated databases. Various apparatus such as these are used to facilitate group creation, group collaboration, group to group media sharing and storage of records and data of group interactions for archival purposes and later review and analysis.

A suite of tools allows players to collaborate in creation and production and post-production analysis of a range of events, from simple, family-driven events involving small groups, to community-driven or regional events which involve hundreds of players, to complex multi-venue events with tens of thousands of players in multiple groups and multiple sites interacting simultaneously.

In the preferred embodiment of the group to group interface, this system and method enables video and the increasingly rich media capabilities associated with group interaction, to link multiple large screens together so as to create a unified "media play space" between groups in one site or multiple groups across multiple sites. Similarly, multiple groups in multiple living rooms may use in-home capabilities, such as IPTV® and capabilities similar to IPTV®, to engage in such activities.

In the collaborative group to group interface, during events that occur at one or more sites simultaneously, this system and method functions as a media and interaction command and control center. The interface also allows individuals and groups to participate in the media by employing collaborative tools that enable them to interact at varying levels of interactivity and control. Both interactivity and control access are available from a broad spectrum of connected sites during the event.

In the group to group game formats and content models for use of the interface, this system and method allows individuals and groups to search for and aggregate information, media and other data. Furthermore, groups may form media teams from across multiple locations and to collectively produce segments or to create complete event plans which occur between groups situated at one or multiple sites simultaneously.

The group to group interface thereby facilitates the ability of large groups to aggregate media and information tied to specific locations or events or other "media centers of gravity" so as to be able to "populate" maps, web-sites, social networks, media events and other focal points of media archives. Created by multiple organized groups gainfully employing the group to group collaborative interface, such media archives allow player groups to prepare media entries for a broad range of game formats and content models.

In the group to group production platform, this system and method utilizes, singly or collectively, video and photographic cameras, a range of microphones, thermal imaging, motion tracking and detection systems, among other forms of media capture. Corresponding displays and monitors, including holographic projection, projection on fog or smoke screens, or on other non-traditional displays, are employed to facilitate, capture and to project or make visible that group interaction. The group to group production platform also provides participants the ability to share that interaction with other groups either on-site or with one or more remote locations simultaneously or a-synchronously.

In the group to group production platform, this system and method allows for groups to engage in a broad range of interactions and activities which collectively function as group control inputs, interacting with the group to group interface. This functionality allows participating groups to engage in activities and interact via the group to group interface either together and simultaneously or a-synchronously in game and contest formats and within collective content production models. For example, multiple large groups in multiple sites will be able to create a group dynamic by collective inputs using cell phones as game controllers.

Additional elements may be added to the system to enable groups of, for example, sports fans throughout the world to interact by going to pre-determined and/or specially equipped venues such as movie theatres, stadia, or other locations and by those groups being included in the groups of interacting fans. These fans may take part in rotating interaction by means of a group to group interface facilitating interaction as provided by the system and method of this invention.

Another embodiment of the present invention, within the context for use of in-home capabilities similar to IPTV®, is the planning, scheduling and execution of a family event, such as a birthday party, remotely utilizing the system and method of this invention. Using the present invention, a family in numerous diverse locations could coordinate, schedule and collaboratively plan events, such as a birthday party, to take place simultaneously, while sharing the event through video, audio and organized, simultaneous interaction. In addition, the event and all related planning and details may then be "saved" for archival review or sharing later.

The preferred embodiment of the present invention enables interaction between at least two groups. However, this does not preclude use of the group to group interface to facilitate interaction between portions of a single group in a single location. For example, segments of an interaction may be pre-recorded such that only one group is present at a particular interaction or planning session.

In either scenario, there are provided numerous interaction elements whereby each group may interact with the other(s). Examples of these elements may include video, audio, photography, thermal imaging, motion detection and other means, such as use of hand held devices as to capture, input or manage data as part of a collective group to group interaction. These elements are used to enable the interaction between the two or more groups. The interaction may have an effect directly on the groups, such as the case in which audio communication transmitted to the other groups. The group interaction, may, alternatively, directly affect images on a screen, monitor or display or other element present for one or more of the groups.

Within the stadium context, for example, two groups may "compete" to determine which of the participating groups are better at coordinating their group interaction. The microphones, typically employed so as to project voice communications across groups, may instead be used with special applications and or other devices to gauge, for example, the synchronicity of clapping, cheering, vocalization or other audio cues being collectively generated by both stadia fans groups as part of the contest.

In this example, one stadium may "win" the contest by producing the most synchronous sound, thereby enabling interaction between the groups in the form of a contest. Similarly, "rounds" of singing or multi-site collective performances may take place across stadia and/or homes (in the case of the family gatherings). Numerous types of interactions, in the form of game formats and content models are available to be used employing the system and method of this invention.

The interaction need not only include two groups. Any number of simultaneous groups may be involved. It is possible to include groups participating simultaneously from properly-equipped stadia, National Monuments, homes, natural wonders, movie theatres, zoological gardens, theme parks and any number of other gathering places within the scope of the group to group interaction.

It is therefore an object of the present invention to enable group to group interaction. Another object of the present invention is to enable multiple types of group to group "upstream/downstream" collaborative media interaction such as group cheering, singing, group voting, group dance or game competitions, group motion detection, group avatar control, group media festivals, group performances and other "upstream/downstream" group actions and interactions across multiple locations including large and small groups of people.

It is another object of the present invention is to enable this type of interaction such that it is simple to use and understand for an average group of users. It is a further object of the present invention to provide in advance of an upcoming event, planning, organizing, editing, archival recording and data capture related to the interaction for use in later review and analysis and/or future planning.

The novel features which are characteristic of the invention, both as to structure and method of the operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE INVENTION

Figure 1:
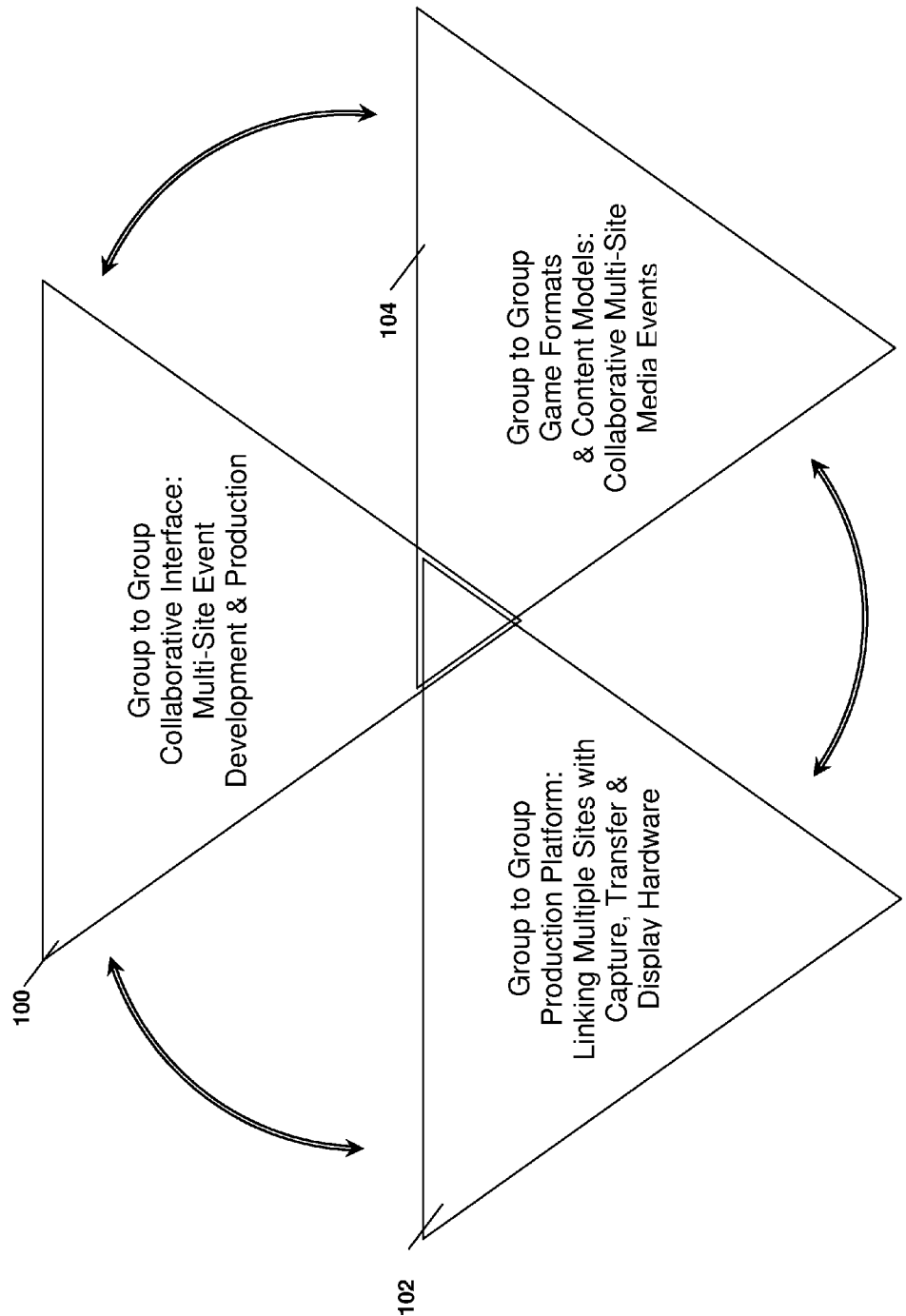
FIG. 1 illustrates the three primary categories of the system and method for group to group entertainment of the present invention.

Turning to FIG. 1, the three primary elements or parts of the group to group entertainment system and method of the present invention are shown. These three primary elements maybe used singly or in combination with one or both of the other two parts as necessary for different planning and production applications. However, it is to be understood that this system is merely exemplary. Other systems utilizing additional or fewer elements may be employed to accomplish the methodology of the present invention. Examples of this system are depicted in subsequent figures.

The first component that makes up the system and method of the present invention is the group to group collaborative interface 100. This component includes software embodying various methods for use in planning and production of multi-site group to group collaborative events. This software is described in detail below with reference to FIGS. 7 through 11.

The next component is the group to group production platform 102. This component includes all of the relevant hardware necessary for accomplishing the collaborative execution of multi-site projects, data capture and display of group to group events. This element includes the hardware depicted in FIG. 2, but may include additional elements or fewer elements.

Finally, the group to group game formats and content models 104 is shown. This component is the third portion of the present invention. It encompasses the collaborative media games, group media strategies and other group to group content models that may engage, organize or involve the software and hardware components necessary for planning, developing and carrying out those games formats and other content models for multi-site upstream/downstream interaction.

Figure 2:
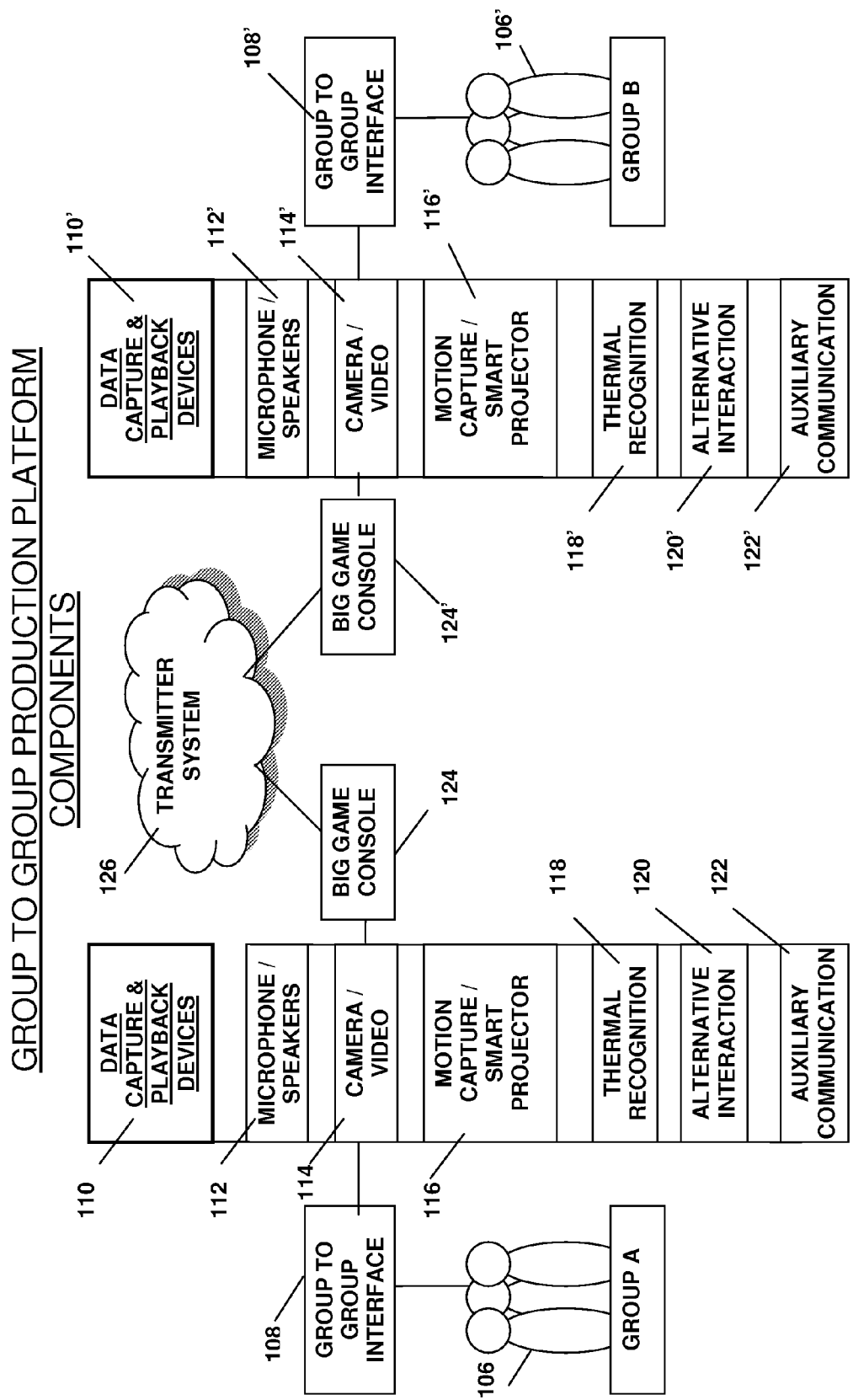
FIG. 2 depicts group to group production platform components for group to group upstream/downstream interaction.

Turning next to FIG. 2, an example of group to group production platform components for upstream/downstream interaction is depicted. The first elements in any group to group interaction are the individual groups 106 and 106', respectively. In this figure, the groups are represented as group "A" 106 and group "B" 106'. It is to be understood that any number or size of groups may be organized or scheduled to participate in advanced coordination and may interact by means of this system. For example, three or more groups a may interact by means of this invention. For purposes of simplicity only two groups are shown and described herein.

In the subsequent description of FIG. 2, the element numbers including a prime are to be considered the same element as the element without a prime, such as group "A" 106 corresponding to group "B" 106'. It is to be understood that these elements need not directly correspond in a 1 to 1 ratio for every group. For example, a group in a movie theatre may only have a subset of the data capture and playback devices 14, 14' that are available in a stadium or home. Any combination of these elements is intended to be encompassed within the scope of the present invention.

Group "A" 106 and group "B" 106' interact with each other by means of a group to group interface 108, 108'. In modern data structures, this group to group interface, 108. 108', respectively, may be understood to be actually an organizational system providing the ability to collectively develop and also access an event for all participating sites and by extension, their surrounding communities.

The group to group interface, 108, 108', respectively, allows any group to prepare for an event in advance, to organize their presence at a properly equipped venue and to coordinate their group activities. This is intended to include the commercial and educational community beyond the venue, so as to culminate in a simultaneous interface with any other group or all groups participating in an event and to save event-related data for archival review and use in later planning.

In anticipation of an upcoming event, a participating group may use the group to group collaborative interface 108, 108', to develop, plan and coordinate their interactivity in the event. The group to group collaborative interface 108, 108', may be used via any number of displays or other embodiments. In some embodiments, groups 106, 106' would make use of their home computers, or their handheld computers or cell phones to use the group to group interface 108, 108' in advance of an upcoming event to coordinate their planned interaction. During such an event, the group to group interface 108, 108' may be displayed on a video monitor, on any type of projection system, on a large screen monitor or on a television, computer or handheld screen.

The group to group collaborative interface 108, 108', used in connection with the other elements depicted in FIG. 1, may act as a "collective facilitator" through the use of which, all groups may interact, synchronously and a-synchronously, before during and after an event or events, by means of, for example, a "round robin" mechanism for rotating the focus of attention or through use of a methodology involving group determination. These and other formats for group interaction permit multiple participants to use the group to group collaborative interface 108, 108'.

In alternate embodiments, the group to group interface may have a range of inputs such as body movements or vocalization, as a group or singly. Such inputs may not require any action other than the body movements or vocalization in order to engage the interface. In yet other alternate embodiments, the interface may make use of such inputs as large numbers of cell phone signals as a mechanism for group control of the interface. In yet another alternate embodiment, the group to group collaborative interface 108, 108' may process a range of inputs provided simultaneously by different groups at different sites.

It is to be understood that the group to group collaborative interface 108, 108' may be implemented in varying degrees at any number of locations. For example, at one location, only microphones, loudspeakers, video cameras and displays may be used, whereas in another location a multiplicity of other inputs and outputs may be provided. It is further to be understood that the group to group interfaces 108, 108' are, in effect, a single interface, allowing direct interaction between all groups involved in upstream/downstream interaction.

The next elements depicted are the hardware and software means by which interaction takes place within this group to group interaction. These are described as data capture and playback devices 110, 110'. Several specific capture and playback devices are shown in this group, though fewer or additional devices may be employed as well. This list is to be understood to be an example. Additional or fewer elements may be included.

A first device is a microphone/speaker combination 112, 112'. This combination is used in any context to gather audio data from each source group and to subsequently translate that data to target groups. The microphone/speaker combination 112, 112' may also be used to gather audio data for use in competitions, as described above, such as the "synchronous stadium" competition.

It is to be understood that the microphone/speaker combination 112, 112' is used, as are all of the data capture and playback devices 110, 110' with the group to group interface 108, 108'. The microphone for a particular group will be used simultaneously (or substantially so) with the speaker or monitor for all other groups. Similarly, other data capture and playback devices 110, 110' for one group are employed in conjunction with the corresponding portion for other groups.

A camera/video monitor combination 114, 114' is used to gather video data from one or more groups and to provide that data to other groups by means of video monitors, or projectors and screens or other means of visualization. This exchange, as in other exchanges using this system, takes place substantially simultaneously. In these scenarios, groups may both see themselves as they will appear to remote participants, and, as well, they may simultaneously see video imagery of remote groups and to be able to respond to those remote group actions.

The microphone/speaker combination 112, 112' and the camera/video monitor combination 114, 114' may be employed, for example, to carry out group exchanges or interactions such as "call and response cheers," coordinated crowd "waves" or taking part in competitions simultaneously such as the synchronous crowd competition described above.

Also included in the preferred embodiment of the invention is a motion capture/smart projector combination 116, 116'. The motion capture portion of this element is designed so as to capture motion carried out by a particular group. In the case of stadium to stadium interaction, the motion capture portion is designed to measure the motion of the crowd as a whole. In the case of an in-home use, the motion capture may be used to capture the motion of a group ranging from two to ten or more people present in the room.

The motion capture portion is then translated in real time through the big game console 124, through the transmitter system 126, to big game console 124' at one or more participating sites, to the motion capture smart projector 116, 116'. This motion capture smart projector 116, 116' is capable of translating, in connection with suitable software, the motion of the large group or in home individuals or groups into projected avatars or other images on a screen. Alternatively, the video monitors previously described may be used to translate the captured group motion into a visual display on the video monitors for all groups simultaneously.

Next, thermal recognition devices 118, 118' are used to gather thermal information about the group. Just as in the motion capture process described above, the thermal recognition data could be used between sites, for example, to carry out a group to group competition as to which group. For example, in the stadium context a group may work as a team to engage in coordinated physical activity to actually "heat up" the most participants in a given section of an audience through coordinated group activities. Alternatively, it may be used to quickly gauge numbers of individuals involved (or not involved) in an activity of certain groups so as to calculate and display the percentage of the overall relative participation of a group.

An alternative interaction element 120, 120' is intended to represent any number of alternative methods of interaction that may be provided. Examples include infrared data transfer, Bluetooth® wireless capability or other methods by which input to and from various devices may be used to affect group interaction, to include devices such as telephones, personal digital assistants, specialty devices with Radio Frequency Signatures, or such proprietary devices as controllers from, for example, devices similar to the motion-driven game controllers of Nintendo® Wii® game systems.

Additional examples include devices for measuring a particular sound level or tone, interfaces to existing computers for gathering ticket data, night vision cameras and virtually any other means by which group output, interaction or input may be generated and/or measured so as to facilitate group to group interaction. Numerous devices are envisioned and other devices may be incorporated whereby one or more groups or members of groups may interact with other groups.

Auxiliary communication means 122, 122' include short wave radio, ham radio, 802.11a-g wireless internet, AM and FM radio, text messaging, multi-media messaging, infrared, Bluetooth® wireless systems, CB radio and other communications means. These auxiliary communication elements 122, 122' are intended to point out that users need not actually be immediately present in order to interact with the group if other interaction methods are available to remote participants who wish to coordinate their actions with the ongoing interaction.

Similarly, the transmitter system 126 of the preferred embodiment may be down or unavailable. Therefore, the auxiliary communication devices 122, 122' may be used to continue facilitating interaction between two or more groups as, or example, in the case of an emergency situation, as might have been possible during Hurricane Katrina with the New Orleans "Super Dome." When, in an emergency, real-time video may not be transmittable over the preferred form of communication, interaction between two or more groups may still take place utilizing alternative means of communication such as short wave radio, citizens' band radio or text messaging.

A big game console 124, 124' through use of the group to group collaborative interface provides command and control of that data being gathered by the various data capture means are simply encoded and supplied to the alternate group playback devices 110 and 110'. The audio from group "A" 106 is captured using the microphone 112 and is encoded by the big game console 124 and supplied to the big game console 124' to be decoded and presented to group "B" 106'.

In the preferred embodiment, this data is usually provided directly to the other groups within the communication, while simultaneously being provided for alternate means as well, such as for broadcast. For example, if a game is on-going, a competition to determine which of several groups can make a group sound that is closest to a given pitch tone can be mounted. During the competition, data is provided to each of the groups in the form of audio and video output through the speakers of element 112 and 112'. At the same time, raw pitch accuracy data may be provided, preferably on a video monitor such as in camera/video element 114. Simultaneously, a graphic may be produced depicting the "struggle" for "best group pitch" graphically on the video monitor element of the camera/video device 114.

The group to group big game consoles 124, 124' also include software sufficient to enable one or more individuals to act as technical administrators over the interaction. This administration may be done by one individual or may be controlled by one or more of the groups taking part in the interaction by means of a shared group facilitation or other system. Through use of the group to group collaborative interface, big game consoles 124, 124' contain means whereby contests and other group interaction and collective performances may be initiated and all or portions of the interaction may be controlled.

In this way, the interaction may also be wholly or partially controlled by way of the group to group interface 108, 108'. For example, at a large event, a device, such as a cell phone, may be used to interact with a contest or game taking place in one stadium or more. In smaller events, a computer screen employing a mouse or motion detection from a video camera or other device may be used as a means to direct the interface.

For example, a single technical user or several user of the big game console 124, 124' may control the initiation of every game and group to group interaction. Alternatively, a single user or group of users taking part in the group to group interaction may control the games or interaction methods employed by means of a "vote" or by winning other contests between sites. This allows control of the group to group upstream/downstream multi-site even to be, at least partially, controlled by the individuals involved in the event.

The transmitter system 126, in the preferred embodiment, is a high speed data network utilizing fiber optic cabling and/or satellite direct feeds or micro-wave or other means of high speed data transmission to the various group sites, such as group "A" 106 and group "B" 106'.

The transmitter system 126 is designed in such a way as to allow the transmission of real-time variable quality including high quality (such as high definition television quality) video and corresponding variable quality audio and other associated data. Furthermore, the big game console 124, 124' provides, with as little data loss as possible, the relevant data across the transmitter system 126 to each of the sites.

It is to be understood that variable quality video and audio may be transmitted so as to allow the interaction to continue in real-time. In alternative embodiments, the big game console is dynamic such that sites not connected by means of fiber optic cable or satellite may experience the group to group interaction but the video and other data may be presented at an alternative level of quality.

Figure 3:
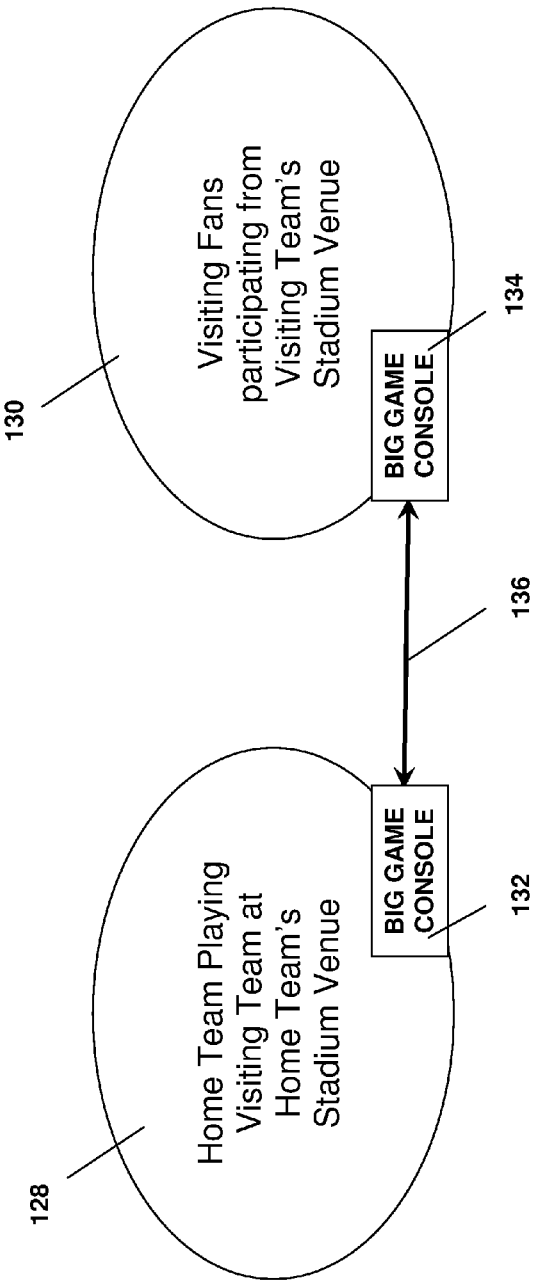
FIG. 3 depicts an example of a venue to venue group to group content model for upstream/downstream interaction.

FIG. 3 illustrates the following scenario. Stadium 128 may have group "A" 106 (from FIG. 2) participants where a game is taking place. Stadium 130 may have group "B" 106' participants (from FIG. 2) the "away" team's fans who are watching the game taking place at stadium 128. The group to group interaction 136 between the two stadia may include all of the elements described with reference to FIG. 2.

The group to group interaction 136 includes means for gathering data at each site, as well as the big game consoles 132, 134. The big game consoles 132, 134, as above, incorporate means for encoding data that is gathered at each site, means for requesting transmission of that data between the sites, means for decoding data that is gathered by any of the data gathering means and means for presenting that data in various forms to, in this case, the other site. It is to be understood that a multiplicity of sites may be included in this group to group interaction 136, as will be seen with reference to subsequent figures.

Figure 4:
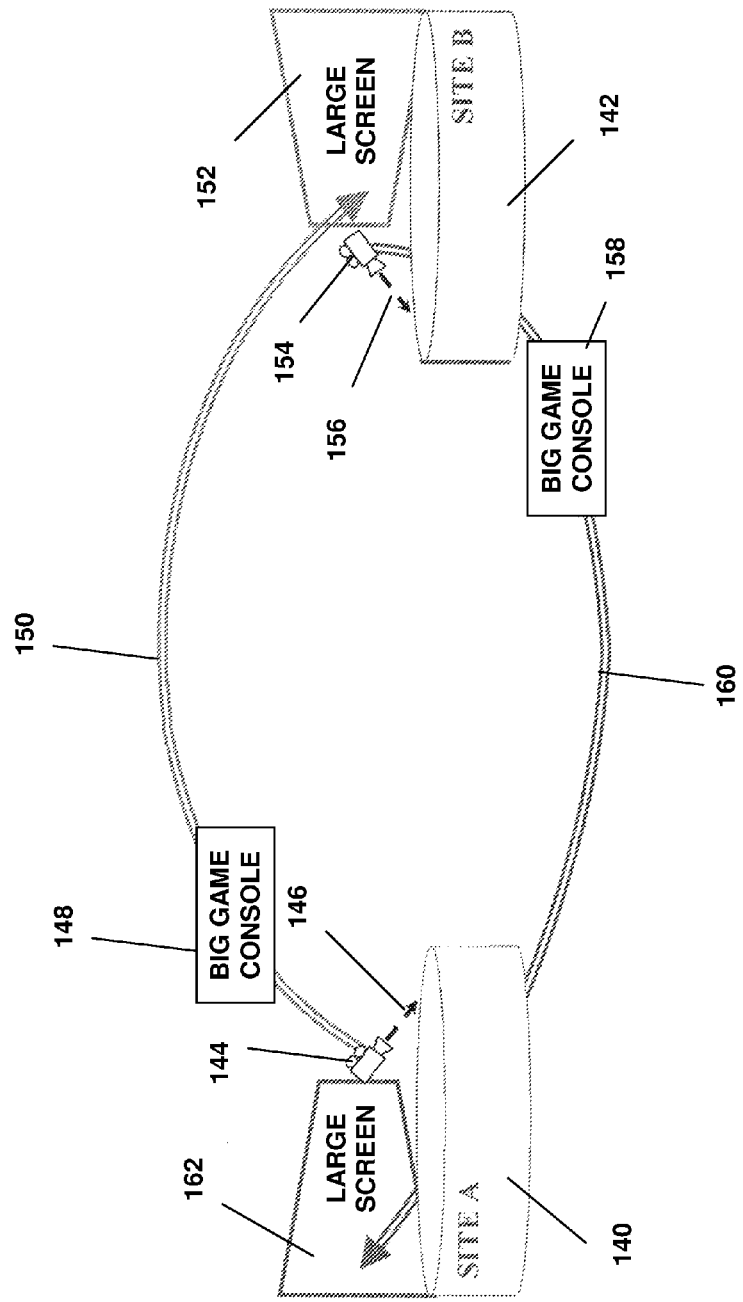
FIG. 4 depicts an example of group to group upstream/downstream interaction on a large screen production platform.

Referring next to FIG. 4, an example of group to group upstream/downstream interaction on a large screen production platform is depicted. This system provides means by which at least two groups may interact. While the example system shown includes only two groups for simplicity, any number of groups may be used.

A first element is site A 140. This is the location of the first group to take part in the interaction. In example embodiments, this may be a group of fans at a sporting event, a group of individuals at a national monument or any number of participants gathered for any kind of event or gathered specifically to take part in a group to group interaction.

A second element is site B 142. The individuals at site B 142 are also ready to take part in the group to group interaction. This may be, in the example of site A 140 holding a sporting event, a group of fans in the home town of one of the star athletes of the game, or, alternatively, a group of home fans watching within their home stadium as their team is at an away game or, alternatively, a group of fans gathered in a movie theatre or other specially-equipped venue with a large screen and appropriate seating capacity.

Next, in this example, a first camera 144 records data 146 related to site A 140. The camera 144 represents one or more of the data capture and playback devices 110 (of FIG. 2) and may not, in fact, be only or at all a video or photographic camera. For purposes of example, however, the camera 144 will be understood to represent a video camera.

The camera 144 records data 146, which represents, for purposes of example, video and corresponding audio data. It is to be understood, however, that this data 146 may be one or more of the data types captured using the data capture and playback devices 110 (of FIG. 2). The video data captured may depict a single individual, portions of the on-going event (such as a game) or, preferably, various groups of people simultaneously, such that they may interact according to the method of this invention.

The data 146 created at site A 140 is then encoded by means of a big game console 148. The big game console 148 creates video, audio, thermal and all other related data that is used as means of interaction created at site A 140 and encodes it for transport to site B 142. In the preferred embodiment, the encoding that takes place within the big game console 148, is lossless, such that very high quality video, audio and related data is included in the received transmission. In alternative embodiments, data 146 may be encoded and sent using a dynamic means such that the quality of the data 146 varies according to the availability of bandwidth or transmission capacity between sites.

The data 146 is then sent via a transmission means 150 to site B 142. The transmission means 150 in the preferred embodiment is a high speed data connection between the two (or more) sites including all data 146 gathered by the various data capture devices 110 (See FIG. 2). In the preferred embodiment, the data 146 is gathered, encoded using the big game console 148, which includes codecs designed to incorporate all of the data 146 gathered and then sent over the network.

The data 146 arrives in encoded form at site B 142 and is then reproduced at the site. In this example, audio and video on the large screen 152 for the fans at the site B 142 stadium. In the preferred embodiment, a system is further employed whereby the data 146 may be interpreted by the big game console 148 or other similar means in order to effectuate a visual response on the large display 152 at site B 142 as a result of actions, motions, video, sound or other group activities taking place at site A 140.

Simultaneously with the activity and transmission of data 146 regarding that activity at site A 140, activity is going on at site B 142 and a camera 154 is gathering data 156 there, as well. The big game console 158 is used to encode the data 156 for transmission. This data 156 is encoded in the same way as the data 146 was encoded and is sent in as high quality and as quickly as possible to site A 140 by use of transmission means 160.

Site A 140 then receives the data 156 and views it, in the example, as video on the large screen 162 or alternatively through the use of graphics or animation on the large screen 162 (or other interactive reaction at site A 140) created as a result of activity at site B 142.

In the context of the example of the sports team's fans, site A 140 may be the site of a football game. Site B 142 may be the home stadium of the "on the road" team, normally associated with site B 142, but now "off site." In this example, fans of the sports team could arrive at site B 142 (a stadium) and participate as if they were attending an actual game taking place there. Traditional television coverage of the game would be broadcast to site B 142, the away team's home stadium.

During interludes, timeouts or other downtime in the live football game, for example, the fans at site B 142 may be seen and can interact with fans at site A 140, for example, in the process of engaging in interactive games. One example game could be a "feel the heat" game. The cameras 144 and 154 (or other devices) for each site, respectively, would be utilized to gather data 146, 156, respectively, such as motion data, temperature data or audio data as to which site has its fans moving in the most cohesive manner, generating the most heat or creating the most noise.

The site that generates the most "response" in any one of these ways may win a game taking place between the two sites. This could result in the next segment of interactive media being played at both site A 140 and site B 142. In this way, a sequence of interactive segments would collectively navigate through interactive potentials between participating groups in one site or between many sites. Such interactivity could be coupled to onsite incentives, for example that could result in a temporary cost reduction for concessions or free giveaway at the winning site's stadium.

An possible embodiment of the group to group game formats and content models would be competitions that incorporate local media resources to become part of a "treasure hunt" or "map making" competition, culminating in large screen to large screen media sharing. Such a use of the group to group interface would facilitate the ability of sports fans, who frequent a given stadium, in support of a favorite team, to be able to prepare for video and media competition, in advance of a specific "game day."

In this media format, group players would prepare for media sharing games by identifying existing media and/or by producing original media in connection with their favorite local businesses. Group players would then co-produce media segments featuring these local assets, so as to place them in competition with other similar local assets at other locations during time-outs or halftime segments.

In the group to group game formats and content models, this entertainment system and method allows individuals and groups to engage in a spectrum of multi-group and multi-site interactions. These include "call & response" activities, in which one or more sites engage in voice-driven site to site cheers, rounds of singing, and/or multi-site performances.

One example embodiment of the present invention is enabling Fan Group A of a given sport team, while situated at their home stadium A, to nevertheless interact with Fan Group B, who are situated at a remote or "away" stadium B, where the sports team A has gone "on the road" or traveled, to play a game against Sports Team B.

In this example, simple group to group interactions that occur between these two Fan Groups A & B may include coordinated games of "catch" occurring "across" the two stadia or as group competitions between the two stadia. Such interaction could involve use of the group to group interface so as to facilitate activities incorporating the tossing and passing of "wireless beachball or bubbleball cameras" in tandem with use of the large video displays typically installed in most stadia. A multitude of other content or games are possible given different sizes and types of groups.

A range of group inputs may be used to allow multiple individuals in multiple groups to interact during such "connected stadia" events. Inputs into the group to group interface 108, 108' (see FIG. 2) may include as alternative interaction 120, 120' (see FIG. 2), among other components, use of mobile, wireless and hand-held devices so as to function as mass game controllers.

Group movements, (detected by motion sensors or infrared detectors, for example) such as standing and/or sitting or making sounds or cheers as a group, can be processed as "group game play inputs." By translating these forms of collective group game play inputs into the group to group interface, the present invention transforms collective group interaction into unified game control inputs so as to facilitate mass processing of and visualization of group to group games and format models for content production and interaction.

Figure 5:
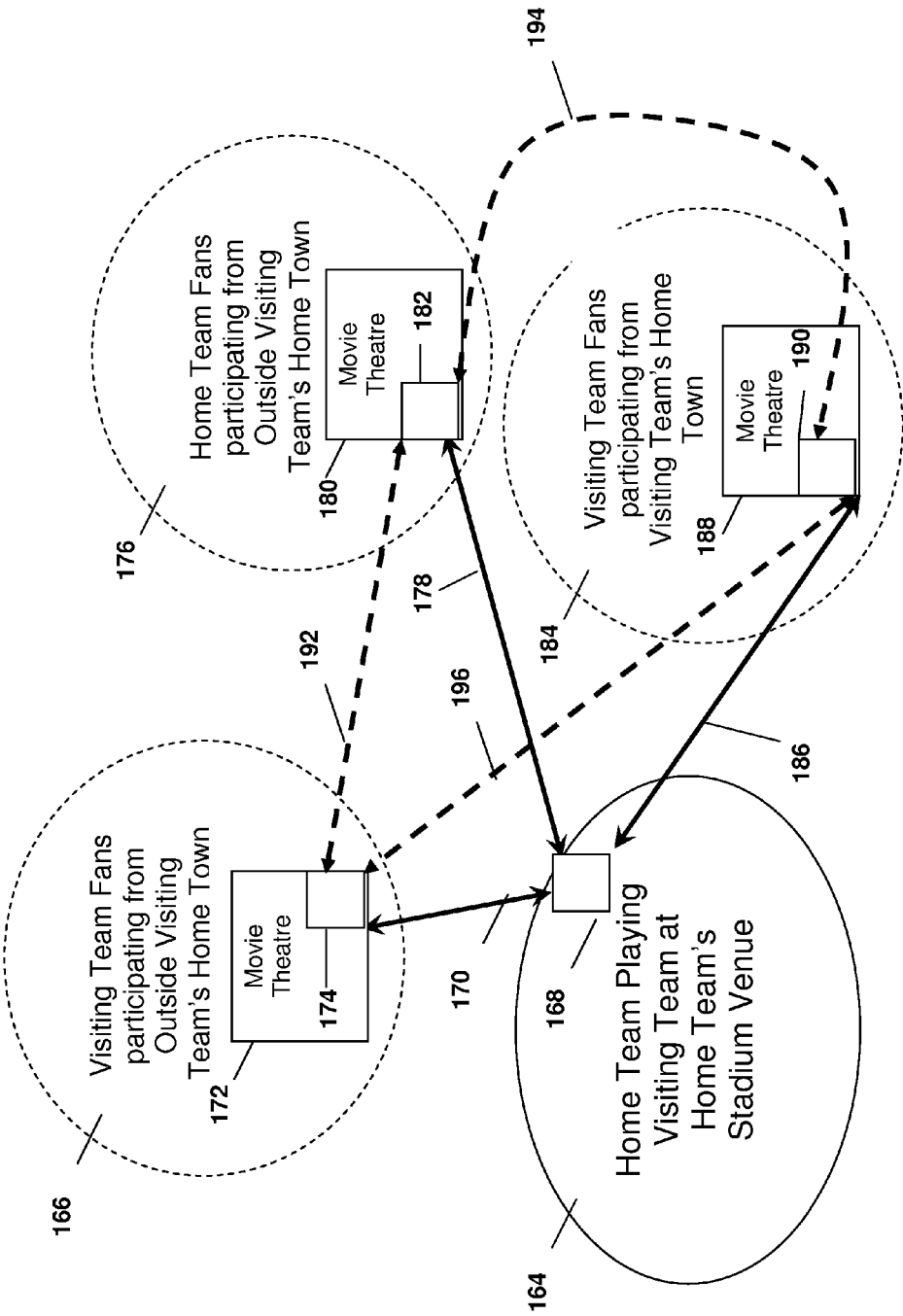
FIG. 5 depicts an example of main venue to multiple remote sites group to group content model on a production platform for upstream/downstream interaction between a stadium and multiple movie theatres.

Referring now to FIG. 5, a similar, but more complex system for using the method of this invention is shown. In this system, a first element is a stadium 164. Stadium 164 is, as in previous examples, the place in which a game is taking place. Stadium 164 is connected to visiting team fans at a first remote location 166, identified as being outside of the visiting team's home town. The first stadium 164 is provided with a big game console 168 so that the group there may interact with groups at other locations.

In this example, the first remote location 166 includes a movie theatre 172. The first remote location 166 is connected, as in previous examples, by means of a group to group interface and production platform 170 incorporating all of the elements previously described, including data capture means, encoding means, transmission means, decoding means and playback or receipt means. As is shown in previous examples, the big game console 168 is the conduit through which data passes.

The stadium 164 is also connected by means of a group to group production platform 178 to another, second remote location 176 identified as being outside of visiting team's home town but attended by home team fans. This second remote location 176 is made up of home team fans present at a movie theatre 180. They also have access to the group to group production platform 178 and may interact with the group at the stadium 164. There is provided, as in other examples, a big game console 182, through which the data from each location passes.

Next, an additional, third remote location 184, is shown. This third remote location 184 includes a movie theatre 188 in which visiting team fans from the visiting team's home town may participate. This third remote location 184 is also connected by means of the same or similar group to group production platform 186, which, as above, communicates utilizing a big game console 190.

Notably, in this example embodiment, the remote locations 166, 176, 184 are not directly connected to each other. In this example, those remote locations 166, 176, 184 are not able to interact, directly, with each other. In alternative embodiments, direct connections between all the remote locations and the stadium (or stadia) will also be provided.

An example of this direct site to site connection is depicted in connecting elements 192, 194, 196. In alternative embodiments utilizing site to site connections 192, 194, 196, the group to group production platform communications are made up of a multiplicity of sites, each able to interact directly with each other. In this embodiment, interactions may occur between sites of which all other sites may or may not be aware.

The fans at each of the remote locations 166, 176, 184 may interact with the fans present at the stadium 164 as the game is on-going in much the same ways described with reference to previous figures. The fans at any of the sites may take part in any games, actions or other activities that are specific to interactions between two linked sites.

Figure 6:
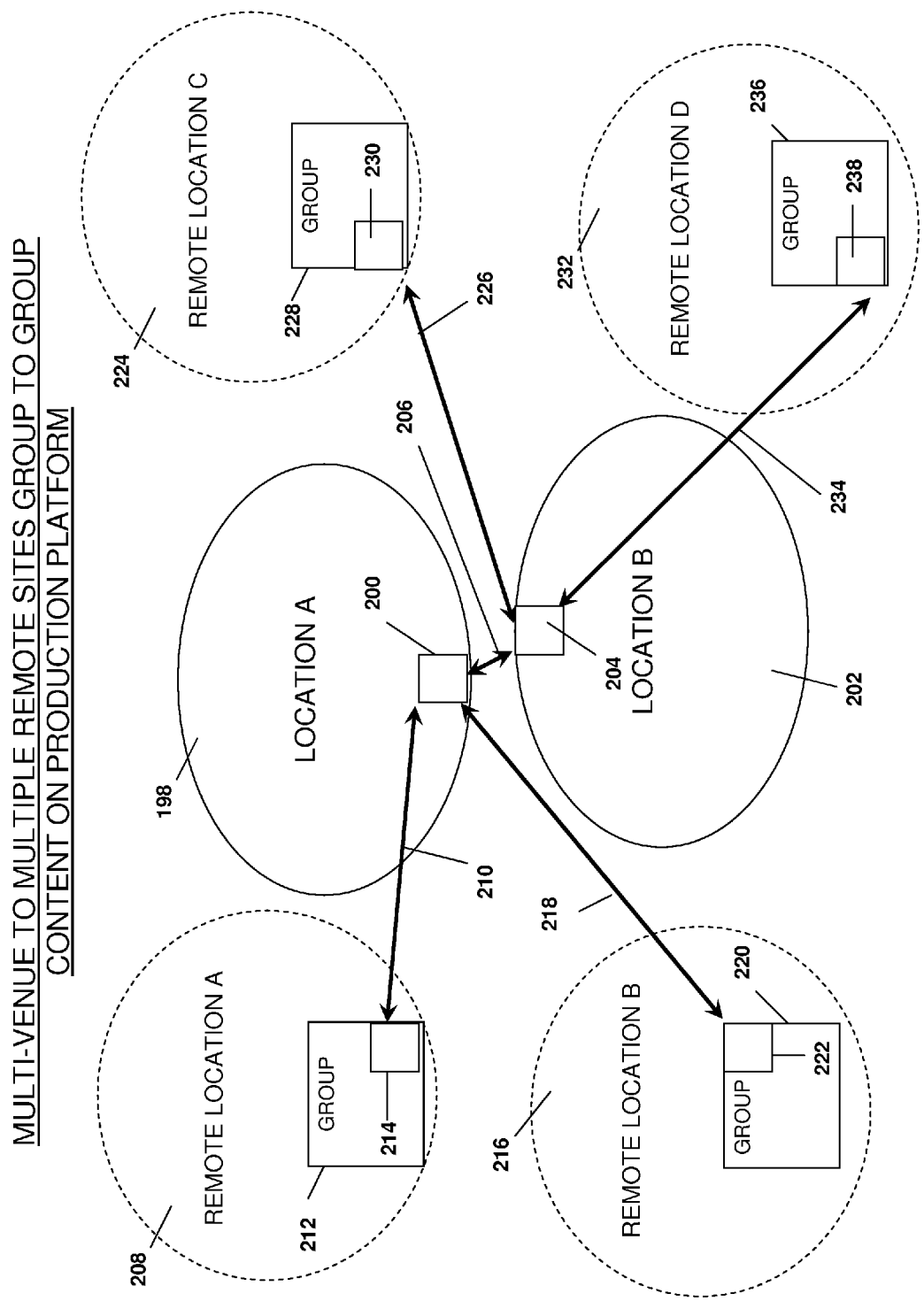
FIG. 6 depicts an example of multi-venue to multiple remote sites group to group content model on a production platform for upstream/downstream interaction.

Referring next to FIG. 6, there is shown an example of multi-venue to multiple remote sites group to group content model on a large scale production platform. In this example, each venue is both connected to the other as well as to additional remote sites, for a total of six sites engaging in group to group interaction. This example scenario depicts a "Made in Our Town" media event featuring a small town community.

It is important to note that in the introductory phase of the group to group production platform, a main event may occur with remote sites participating as in the present example. However, as use of the group to group entertainment system, is used more pervasively, it is anticipated that media programs will be designed to involve use of in-home capabilities similar to IPTV® that include home player in significant events occurring simultaneously in multiple sites that collectively, as one, so as to comprise a single (multi-site) event as a whole.

A first location is location A 198 which is the place in which the main event is on-going. For example, location A 198 may be Main Street in a small Midwest town where families are part of a contributing upstream/downstream interaction that is taking place. Location A 198 includes a big game console 200.

Location B 202 is a second location, which might have members of the press and celebrities participating, is shown connected by transmission means 206 to the town in Location A 198. The big game console 200 of location A 198 encodes and decodes data such that it may communicate with a big game console 204 at location B 202. Location B 202 may be a large amphitheatre, such as the Hollywood Bowl wherein there is a group of people gathered to interact with events in Location A 198 in the small town, for example.

As in the example of FIG. 5, several additional remote locations are depicted. Remote Location A 208, a movie theatre in Boston and Remote Location B 216, a shopping mall in Florida, are connected by transmission means 210 and 218, respectively, to the small town Main Street, Location A 198. A first group 212, which might be members of a social network participating in the event via the Boston movie theatre, Remote Location A 208, and a second group 220, which might be contest winners who are participating from the Florida shopping mall, Remote Location B 216, are connected to the small town Main Street, location A 198, by means of a big game console 214, 222, respectively, employed at remote location A 208 and remote location B 216, respectively.

Similarly, a third Remote Location C 224, which might be a university sports arena in Omaha and a fourth Remote Location D 232, which might be an opera house in Seattle, are connected to location B 202, Hollywood, by transmission means 226, 234, respectively. As above, the two groups 228, which might be university fans participating with the Hollywood celebrities, and 236, which might be performing artists in Seattle, respectively, are able to interact with each other through the use of big game consoles, 230, 238 respectively.

It is to be understood that, at each location and remote location, various data capture and playback devices are employed.(See FIG. 2). The number and type of data capture and playback devices may vary dependent upon the site. The locations, remote locations are intended to be only examples. It is to be understood that any names or types of locations may be used.

In prior examples, the remote locations were movie theatres and the content was a sporting event or other large-scale group media. In this example, the remote locations may be movie theatres, individual homes, state or national park locations, city plazas or town halls, other small town main streets with large exterior video screens, noteworthy locations (such as Times Square in New York City or Golden Gate Park in San Francisco), Natural Wonders such as Yosemite or any number of other locations. It is further to be understood that any number of locations or remote locations may be linked using the method and apparatus of this invention.

It is to be understood that additional game formats and content models include the use of the group to group interface as a means by which to organize, coordinate and leverage location-based media. Additionally, this media may be integrated into later multi-site events and/or online media assets.

The group to group collaborative interface (described below) may be understood as an enabler of "player-produced collaborative media." Prospective participants may access a website and use tool sets on the web site to form a new player group or to join an existing group. As players and player-groups create media and other data in order to participate in online events or in multi-site real time events, these players collaborate in production of the media and in preparation for participation in upcoming events. This is the meaning of the term "player-produced collaborative media."

The group to group collaborative interface may also be understood as an enabler of "player-produced collaborative media" within the context of "media centers of gravity" which refers to the way in which a venue or event site may become a media focal point. For example, an open field at the edge of a town may become a media center of gravity when a circus is set up there.

Similarly, specific venues or locations participating in a multi-site event may become media centers of gravity as the designated event, performance or game day approaches. As the upcoming event approaches, this media center of gravity becomes the object, or the anchor point, of online interactive media strategies, competitions and other promotions involving online social networks which are preparing for the upcoming event. A site or venue may also become the focus of broadcast media campaigns which occur through traditional media channels, compelling the attention of the surrounding community.

When "player-produced collaborative media" is developed within the context of the businesses and community concerns which surround a venue (or media center of gravity) such content can be referred to as "venue-centric media." When player-groups use the group to group collaborative interface to facilitate development of local subject media in partnership with area businesses and/or community concerns surrounding a given venue, or surrounding other selected media centers of gravity, this process can be referred to as "venue-centric e-commerce media."

Use of the group to group collaborative interface can also facilitate game formats or content models that leverage venue-centric e-commerce media for "bid for or buy through" activities linking locale-driven venue-centric media segments online and within live multi-site events. For example, through invitations within an online social network, a group forms and makes plans to use the group to group interface to participate in an upcoming multi-site media competition, which is scheduled to take place during a football halftime show. Members of the group agree upon criteria for thematic media as appropriate for the upcoming media competition.

For purposes of this example, the group selects musical instrument stores, or artisans who make musical instruments, as the subject of their media. Using the group to group interface, participants in multiple locations then identify shops or sites or individuals they feel will be interesting subjects for the upcoming media competition. Over a period of time, smaller groups form and these participants each use the group to group collaborative interface to organize and to produce a media clip, animation, video, audio clip or other media submission that is tied to the location and subject of their choice. These media submissions would be made available to a website with access to the group to group interface.

Player-groups may then rate the most popular submissions from across all sites. The top rated submissions would then be included in the football halftime media competition. During the competition, multiple groups in multiple sites would be able to view the media submissions from all participating locales in real time. This allows each site to be part of a live multi-site event. Also, through use of the group to group interface, all audience members present in multiple sites would also be able to use their cell phones as remote controllers to vote for their favorite clip.

Participants are also able, ultimately to bid for or buy certain items featured in the venue-centric e-commerce media which may available for sale from the shops or artisans. Venue-centric e-commerce media assets such as the above-described, for example, can then be leveraged by using the player-produced media clips and/or other data to populate an interactive travel map or game board map, or other form of interactive menu. This use of the player-produced media would then allow web site visitors, other players and other users to "navigate" such maps and/or game boards to research or "shop" a particular venue e-commerce community. This example scenario describes several layers of the game formats and content models made possible by the group to group interface and production platform.

Figure 7:
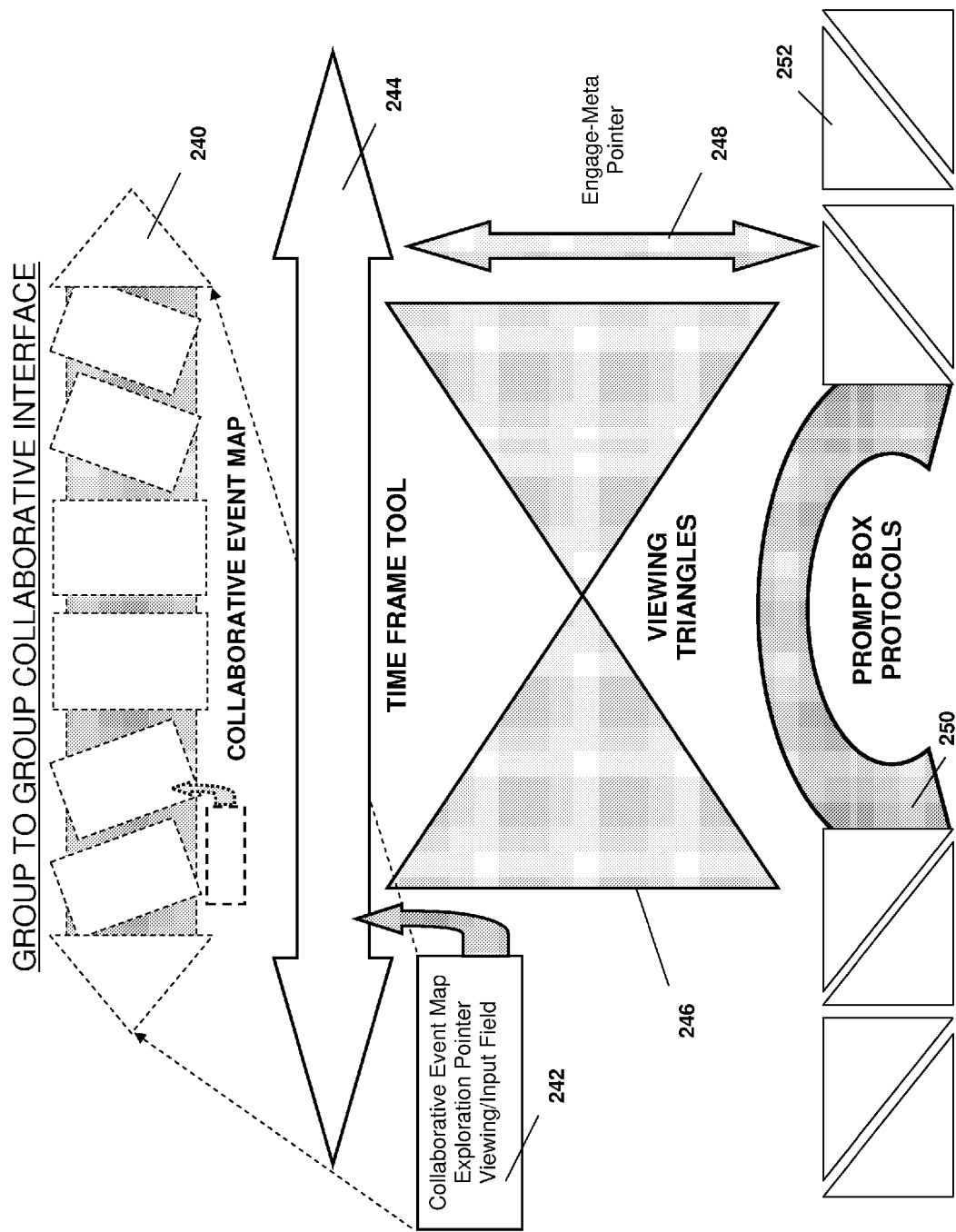
FIG. 7 shows layers of the group to group collaborative interface for group to group upstream/downstream interaction.

Turning next to FIG. 7, portions of the graphical user interface of the preferred embodiment for group to group interaction are shown in a single view. This drawing represents the preferred embodiment of the interface embodying the method of the present invention. However, it is to be understood that this drawing is merely exemplary. Other embodiments of the invention utilizing additional or fewer elements may be employed to accomplish the methodology of the present invention.

It is to be understood that various forms of this interface may be made while still accomplishing the objectives and functionality of the interface depicted. More complex and simpler system interfaces may be created whereby one or more users in a group may accomplish all or some of the tasks described below with specificity. It is to be understood that as different player groups engage in use of the group to group interface, they have the option to configure the tool sets in a manner that conforms to their specific user needs as well as according to the specific game being played or event taking place.

The first element depicted in FIG. 7 is the "collaborative event map." 240 It provides an interface by which a user may take part in a seven step process for planning and or analysis of events. This element is described more fully with reference to FIG. 9. A collaborative event map explorer 242 is also shown. This is a pointer used to select portions of the collaborative event map 240 with which to interact.

Beneath the collaborative event map 240 in FIG. 7, is found a time frame tool 244 which is used to create and track multiple work flow and "play stream" schedules. It is also used to review past events and to preview future schedules.

Beneath the time frame tool 244 in FIG. 7 are to be found the viewing triangles 246. These triangles 246 allow users of the group-to-group collaborative interface to assemble and to vary the size of multiple views of participants and sites and contributing media and/or data. Next to the viewing triangles 246 is the engage-meta pointer 248. It is employed by users to select a level of current engagement in the planning or execution process underway utilizing the method of this invention.

For example, set to fully engaged, the meta-pointer potentially places participants within the ongoing group to group event, as if on "center stage." Conversely, set to "meta" the pointer potentially places the user group in the role of a passive observer making notations or comments or generating meta data regarding ongoing interaction.

Beneath the viewing triangles 246 in FIG. 7 is the prompt box 250. These panes, such as the ones in element 240, function as modules or dialogue boxes used in the process of communicating or effectuating different actions, games, events or controls in the group to group interaction at different levels, to a variety of participants and among a variety of members of the production team and group to group interaction participants.

Figure 8:
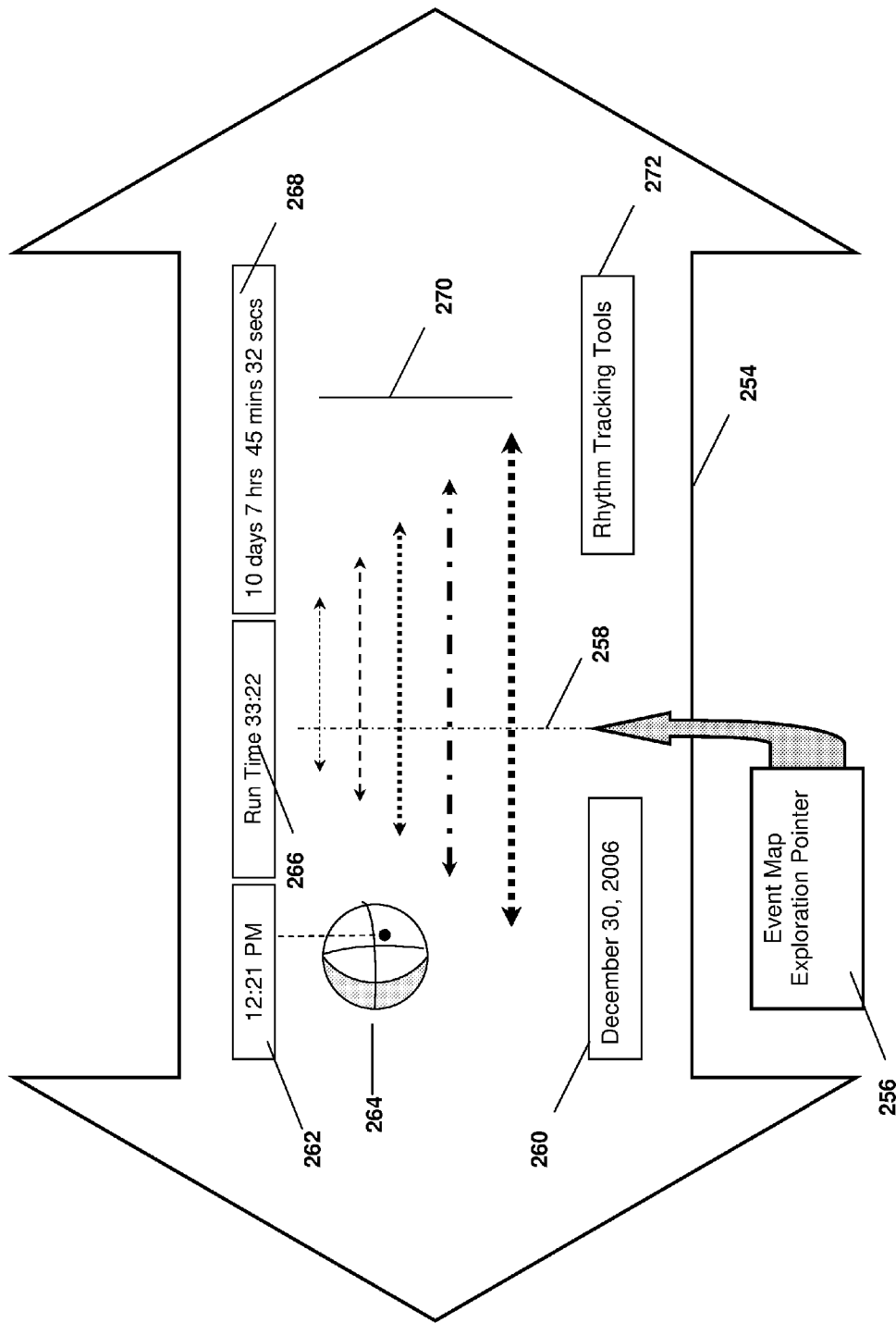
FIG. 8 depicts the group to group collaborative interface time frame tools.

Turning to FIG. 8, the time frame tools 254 are depicted in detail. This portion of the graphical user interface is used as tools for timing, planning, coordination, scheduling functions in advance of an upcoming event. This time frame tool 254 provides numerous means by which a user may plan, view or otherwise comprehend one or more group to group events.

Group to group events are complex. Preparation of an event with many participants in multiple sites and that may occur in potentially multiple times zones, may require several forms of time management. The purpose of the time frame tool 254 is to allow collaborating participants to develop and maintain a frame of reference as to the amount of time available for planned tasks and interactions that are to be part of an upcoming event. Similarly, after an event has already taken place or while an event is on-going, the time frame tool 254 provides reference as to the running time 266 of a specific event or segment of that event.

The rhythm tracking tools 272 provide means for integrating audio, video and other media that must be integrated, in a time-sensitive fashion, for playback during an event. For example, if the event were a distributed family birthday for Grandmother, Grandma's daughter and Grandma's grandson, while working from two different cities, are able to select a favorite piece of music (or create a rhythm track) and, using one of the rhythm tracking tools 272, they may "lay down" a soundtrack for the birthday party, which runs according to a pre-determined set of time selections, according to the countdown clock, or which may be triggered upon manual cues.

To the left of the rhythm tracking tools 272 is the calendar 260. Opening this calendar 260 allows user of the group to group collaborative interface to schedule days and times for events in the work flow and in the play stream. Items scheduled in this calendar 260 will then appear on the appropriate time lines 270 above.

The time lines 270 above the calendar 260 and rhythm tracking tools 272 allow users to create multiple timelines to track the work flow or play stream of participants and/or their sites, so as to facilitate multiple site planning. Users may "zoom in" to magnify the time scale of these time lines 270 so as to plan (or analyze archived media and data or a past event that is being reviewed) by the second. Similarly, users may "zoom out" or "accordion" the Time Line scale so as to view time lines 270 across a scale of several months. Together, the time frame tool 254 creates an "Event Scape" which allows participants to collectively form an overall "picture" of site to site synchronicity and production planning, to include a-synchronous post event "after-party" "modpods." Modpods are addressed in more detail below with reference to FIG. 9.

At the top right of the time frame tools 254, are to be seen the window for the countdown clock 268. This window allows users to set and monitor one or more clocks, timers and other time related devices having to do with upcoming events, milestones or segments within events. To the left of the countdown clock 268 is the window for the task timers 266. This functions much like a stop watch, allows users to time segments (or entire events) or to reference running times for items retrieved from media archives.

Reminders may be sent out to various members of the group at the appropriate set times by e-mail or other device to keep the group on track and unified for various rehearsals, meetings or other preparation. This may be a function used in conjunction with the real-time event such that it counts down to the precise time when the audience section would begin their "call and response" at a specified moment during a sporting event.

To the left of the task timers 266 is the time zone display 264. This window allows users to refer to a graphic of miniature globe, showing the position of participant sites and their time zones. By "mousing over" a specific site on this globe graphic, users can see what the local time is at that site. This time zone display 264 window works in tandem with a clock 262 and the event map exploration pointer 256, so that as the user slides the pointer 256 forward and backward along a selected time line 270, the time zone display 264 will show the relative time for a selected site.

Figure 9:
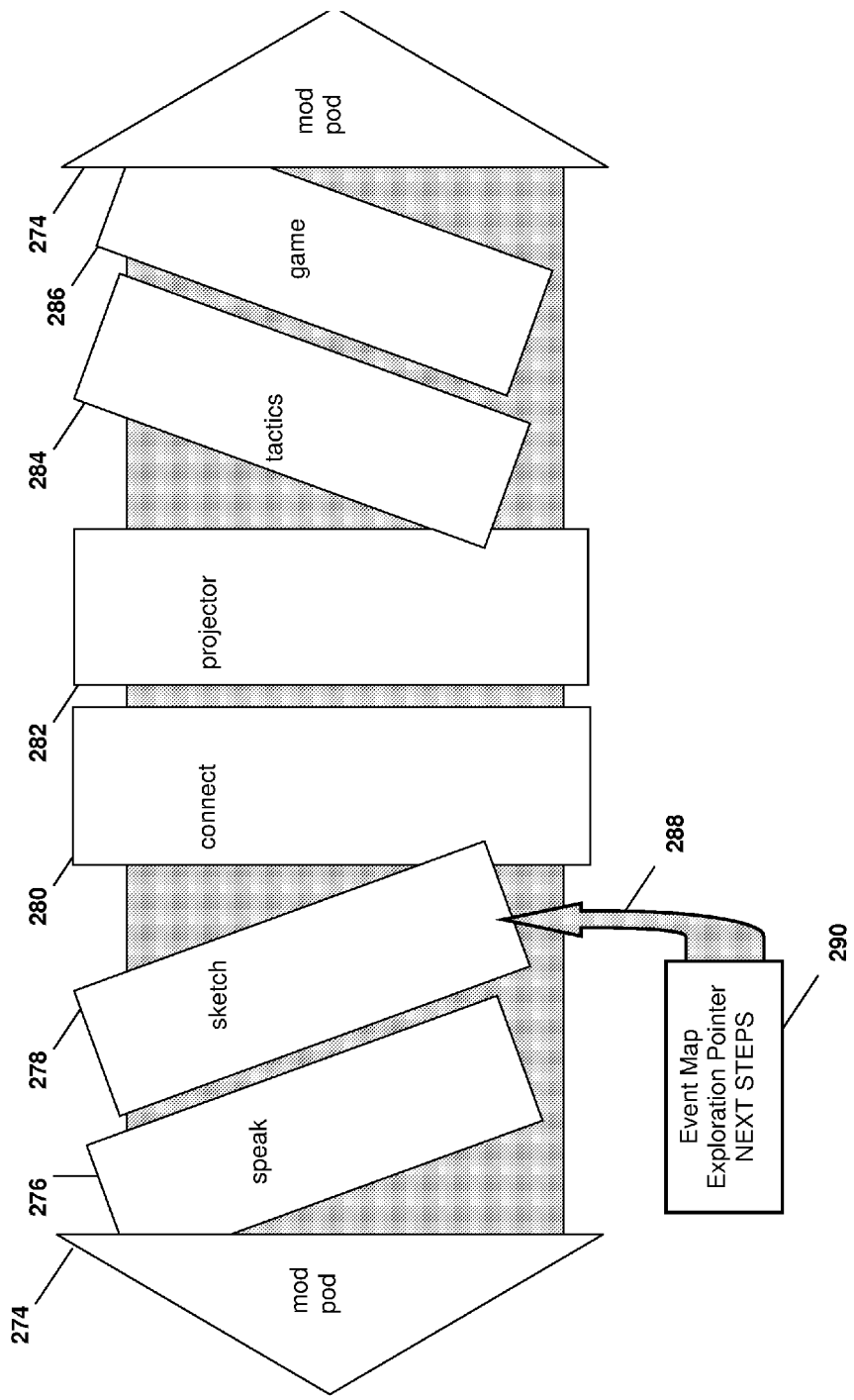
FIG. 9 depicts the group to group collaborative interface event map.

Turning next to FIG. 9, the group to group "collaborative event map" is depicted. It is to be understood that any configuration or number of collaborative event map components may be used to organize, visualize, schedule and facilitate interaction by means of this interface system, but for purposes of simplicity only seven steps in the collaborative event map are depicted in this figure. Additional or fewer steps may be included in alternative embodiments the collaborative event map.

The principal purpose of the collaborative event map is to facilitate effective interdisciplinary group dynamics across multiple sites, with members of the group having multiple types of expertise. This collaborative event map should be thought of as a communications and logistics facilitator. It provides bridges and channels for groups to develop and access effective creative and organizational processes toward multi-site multimedia event production.

The first such tablet is the mod pod 274. The mod pod 274 serves as a repository for archived data regarding previously-completed events. In the preferred embodiment, the mod pod 274 serves to house video, audio, thermal and all other types of data created during a group to group interaction. Similarly, all data created, by way of the other visualization tablets (or other means) in previous event, such as planning sessions, individuals involved, production cues and other planning-related data are stored and retained for review while planning a new event.

Shown in the collaborative event map are the visualization tablets. One such tablet 276 may represent a speaking function. Also shown are a "sketch" tablet 278, a "connect" tablet 280, a "projector" tablet 282, a "tactics" tablet 284 and a "game" tablet 286. Each tablet represents a tool set for a step in the collaborative process required for creating group to group game formats and content models which occur as multi-site events. These visualization tablets represent a cycle of activities and preparations through which a collaborating group to group event production team will engage in order to conceive of, design, visualize and produce multi-site group to group events.

The event map exploration pointer 288 may be used to review the steps in the event scheduling while utilizing the visualization tablets. By entering input or by gathering the input of others, a next steps window 290 on the exploration pointer 288 functions as a repository for preparation and follow-up during the collaborative process.

Long term pre-planning involves both a-synchronous and synchronous events, in which members of a collaborating team work separately and a-synchronously toward a series of segments of synchronous pre-production meetings, at which all are simultaneously participating. Some participants, however, may be involved in a synchronous meeting a-synchronously, by, for example, creating a previously prepared video presentation playback in their absence during a meeting. In such a case, for example, a participant could "load" such a previously prepared video using the next steps window 290, so that when the production meeting arrived, all participants would have their presentation available.

Each tablet, such as the speak visualization tablet 276, provides a "pop out" or additional dialogue box whereby users with access to that tablet may interact or access various planning process steps. In the preferred embodiment, wizards or smart dialogue boxes are presented to the users whereby relevant and useful information may be gathered or otherwise provided. Each site or group would potentially be identified by a separate color, icon or other feature so that the threads of discussion are easily identified.

Utilizing the mod pod 274, a user or group of users planning a new group to group event, may review past discussions, glossaries, vocabularies or individuals involved in past events (for example within the previous event's speak visualization tablet 276). All previous information regarding the planning, preparation and event creation are stored for review prior to beginning planning of an event within the mod pod 274.

Correspondingly, a group or groups may add to the mod pod 274 as they plan and execute events. This is why the mod pod 274 is depicted twice. It is in fact designed to "wrap around" an event, being used at both ends of the event planning process. Some of the additions to the mod pod 274 occur automatically as an event is planned. Other additions are made upon the completion of the event.

The speak visualization tablet 276 is designed to address problems in planning and preparation of group to group projects that result from the lack of a shared vocabulary. The speak visualization tablet 276 provides prompts and feed back, channels for discussion for an on-going process by which members of a team may conduct greetings, introduce themselves, their expertise and their roles, their goals and their geographic setting. Additional prompts may be provided for use in defining user roles.

The speak visualization tablet 276 provides, at least, a dynamically-growing glossary of terms, phrases and other information relevant to planning, preparation and creation of a group to group event. Additionally, it provides a list, including relevant expertise, of individuals involved in the planning and preparation of a group to group event.

Additionally, the speak visualization tablet 276 provides a series of prompts to each user, whereby missing information, such as individuals or groups organizing the group to group event and relevant expertise may be made known to other members of the group and added to the glossary. It is also used to delineate responsibilities in group to group situations wherein roles within a group to group scenario may or may not be defined.

Group to group multi-site events require participants to develop and learn new roles. Among these roles are: Media Master, responsible for creative management of multiple media feeds and inputs being supplied by multiple sites; the On-Site Host, who functions as a producer(s) or facilitator(s) before, during and after events; the Audience Referee(s), responsible for coordinating fair play, timing and good judgment between multiple groups who are engaged in game formats or other content models; and the Technical Lead(s) who focus on issues related to connectivity and the use of the group to group production platform, among others. Any of these roles may be filled by individuals or by groups. Using the speak visualization tablet, these participants are able to engage in an exploration and development process to better cement their group capabilities.

The sketch visualization tablet 278 provides tools for visualizing the ways in which events are going to occur. For example, software is incorporated whereby graphical representations of the locations, flow charts of events, sketches involving planning, videos or graphical representations of previous events and other visual media may be shared across multiple groups as they plan a group to group event. Prompts are provided, within software, to enable brainstorming and group collaborative sketching in multiple forms, so as to help "visualize" the event.

The connect visualization tablet 280 provides a series of prompts to allow individuals at each location to negotiate the ways in which elements must or may be connected so as to facilitate the group to group interaction.

For example, if an event (planned using the previous visualization tablets) calls for video, audio and thermal recognition, connectors or prompt guides are provided in this connect tablet 280 such that each of the sites involved in the group to group interaction are easily able to connect the big game console (see FIGS. 2-6) such that each of those elements are provided to each other location taking part in the group to group event. Additionally, distributed help is provided such that individuals operating other sites group to group interaction may be called upon to assist an individual at a particular location.

These first three visualization tablets make up the preproduction tablets. The speak 276, sketch 278 and connect 280 tablets are all elements utilized by planners, in addition to the mod pod 274, prior to an event taking place. The next several tablets are utilized as the event takes place.

The projector visualization tablet 282 provides a receptacle of graphics, display settings and other visually-related elements such that a user may, both in planning and in the event execution, provide these graphics, displays, games and other visually-related elements to one or more of the locations involved in an event. It also provides, to the production or direction staff, access to cause these displays, games and graphics to be displayed to those locations desired.

For example, the projector tablet 282 enables an event planner to request a particular type of game utilizing an avatar of the "crowd" such that the crowd, in each location, may interact with the avatar or "as" the avatar on the displays in each location of the group to group interaction. It also allows a producer to request or use different types of displays upon which to show these various visual elements of numerous types.

The tactics 284 tablet is used as a receptacle of useful tactics in creating a successful group to group event. Information is stored herein and prompts are provided such that individuals involved in planning and production of a large-scale group to group event may understand, across all locations, that particular times and games coincide.

For example, a tactic, stored in the software represented by the tactics 284 tablet, may provide a prompt to a group to group event producer and participants such that they producer understands that the "7th inning stretch" will occur in a few moments and further that a particular group to group interactive game, is known to have had success in previous 7th inning stretches. It may alert the producer and other participants to begin the interaction of a particular game or contest such as unison singing of a call and response among sites of "Take Me Out to the Ball Game" once the 7th inning stretch has begun.

These tactics may range from dynamic visualization of the on-going event, to a group or individual submission being reviewed and accepted as a part of the interaction, to judgments or ratings of previous games or interactions to buying portions of the group to group event on video or other media.

The game tablet 286 provides a series of tools in order to enable a better understanding of the event as it is occurring. The game 286 tablet provides opportunities and information to a producer or other participants such that they may better understand the context of the interaction as it stands relative to other related activities and events.

If, for example, there are a series of events that will take place such as in a multi-site tournament. As in the earlier described example of gathering media for an upcoming football halftime show, this tablet may provide information related to particular types of interactions, games, sing-alongs and the like that may be useful. The best or most successful games for a particular group to group interaction in light of the context within the game tablet 286 may be suggested.

This tablet can be thought of as the "players' hand of cards" during multi-site, multi-group games and media events. Accordingly, group of players may consult their specific game tablet as they engage in game play during such events. For example, certain games will involve aggregated media contests which use the game tablet to track delivery or transportation of a specific object or person or even animal being conveyed as part of an upcoming event, or ongoing promotion as would be the case with commemorative torch relays.

Other examples include "transportation games" that occur across a distance, which may be integrated into activities occurring over a period of time. These games would allow the delivery of products or game pieces, for example, to be tracked by participating groups and sites. Such deliveries could be made by, for example, carrier pigeon, pony express or other commemorative carrier.

The final portion of the collaborative event map, depicted in FIG. 9, is the mod pod 274'. In reality, this mod pod 274 and the previous mod pod 274 are the same. This is described more fully above. The mod pod 274 provide means by which an event planner(or group of event planners) or previous participants in a past event may store information or media created using any and all of the visualization tablets previously described in the process of planning, producing, participating in or analyzing group to group interaction.

Once a producer or participant(s) of a group to group event determines, for example using the sketch 278 tablet, that it is best to have a single director of the event in one or more of the locations for a particular type of group to group event, that information may be stored in the mod pod 274 at the end of the event. This "word to the wise" may then be referred to by others groups as they initiate future group to group events as they review the prior event in the mod pod 274. Numerous other types of relevant information for planning various types of group to group upstream/downstream multi-site events may be stored within the mod pod 274.

Subsequently, as a different producer and participant(s), perhaps in a different location, plans for a similar group to group event, he or she may be assisted in the planning and development process (along with all other individuals involved in the planning and production of the group to group event) by reviewing the mod pod 274 which was previously produced and is now stored.

The mod pod 274 contains player feed-back capabilities and may include text, audio, video, the listing (and discussion of degrees of success) of various group to group interactions and other information relevant to putting on a particular type of group to group event. The mod pod 274 is designed to also provide a knowledge base from which subsequent group to group events may draw.

The mod pod can be implemented using a "wiki" model of player-produced media improvements in use of the group to group collaborative interface and its tools sets. These may be used to better develop and manage group to group events. The mod pod 274, in this way, effectively archives, updates and applies the feedback of user groups so as to inject into the group to group collaborative interface a "co-developer" relationship with user groups.

Figure 10:
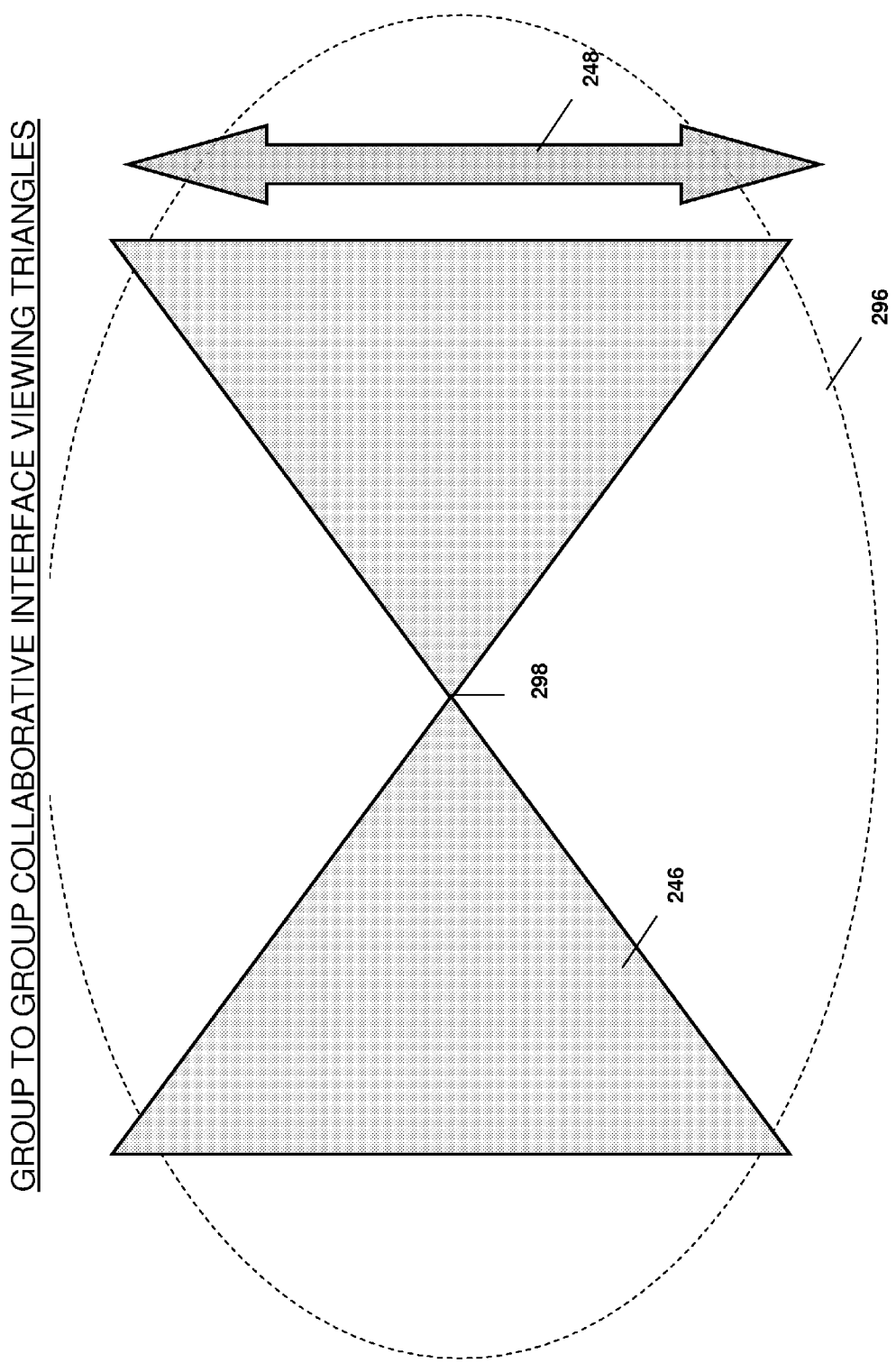
FIG. 10 depicts the group to group collaborative interface viewing triangles, the "media center of gravity," map and the engagement meta-pointer for group to group interaction.

Turning next to FIG. 10, the group to group collaborative interface viewing triangles 246 (of FIG. 7) are shown. It is to be understood that any number of viewing triangles 246 may be included. Each triangle represents a single location (or single camera or other data capture device at a location). A multiplicity of data capture devices (see FIG. 2) may be employed at any location.

As more locations or data capture devices per location are added, more video viewing triangles 246 may be added. Additionally, as more means of interaction are added, thermal imaging, motion detection, audio detection, avatar control, voting mechanism and similar means, additional triangles 246 may be added.

Particular viewing triangles 246 may be provided only to production individuals or to camera operators or to particular locations or individuals based upon need. For example, a producer may need a direct audio and video feed to the producer at a different location such that they can quickly act to address any problems or concerns.

Beneath the viewing triangles 246, is the group to group event game board 296, which includes the selected "media center of gravity" 298 upon which participant groups choose to focus for a specific event. For example, if a specific sports event is to take place at a specific venue, this group to group event game board 296 will depict the location of the main venue, as well as other venues also participating and those remote sites which are participating. By using the viewing triangles to focus their participation on a specific venue, individuals and groups more clearly define their preferred "media center of gravity" 298.

The engagement meta pointer 248 of FIG. 7 may be used by an individual (in the cases in which there is a display per-individual) or by a group (in cases in which there is only one display per a large group) to indicate the level of "involvement" in the activity, game or group to group event generally.

The engagement meta-pointer 248 may be seen by a producer or planner of an event, in addition to other groups taking part in the event, and may indicate a low level of engagement (passive watching of a group to group event) or a high level of engagement (actively participating in upstream/downstream interaction with other groups or the event). Thereby, event producers or other groups may ascertain the level of involvement, at a glance, of groups or individuals participating in the event.

Figure 11:
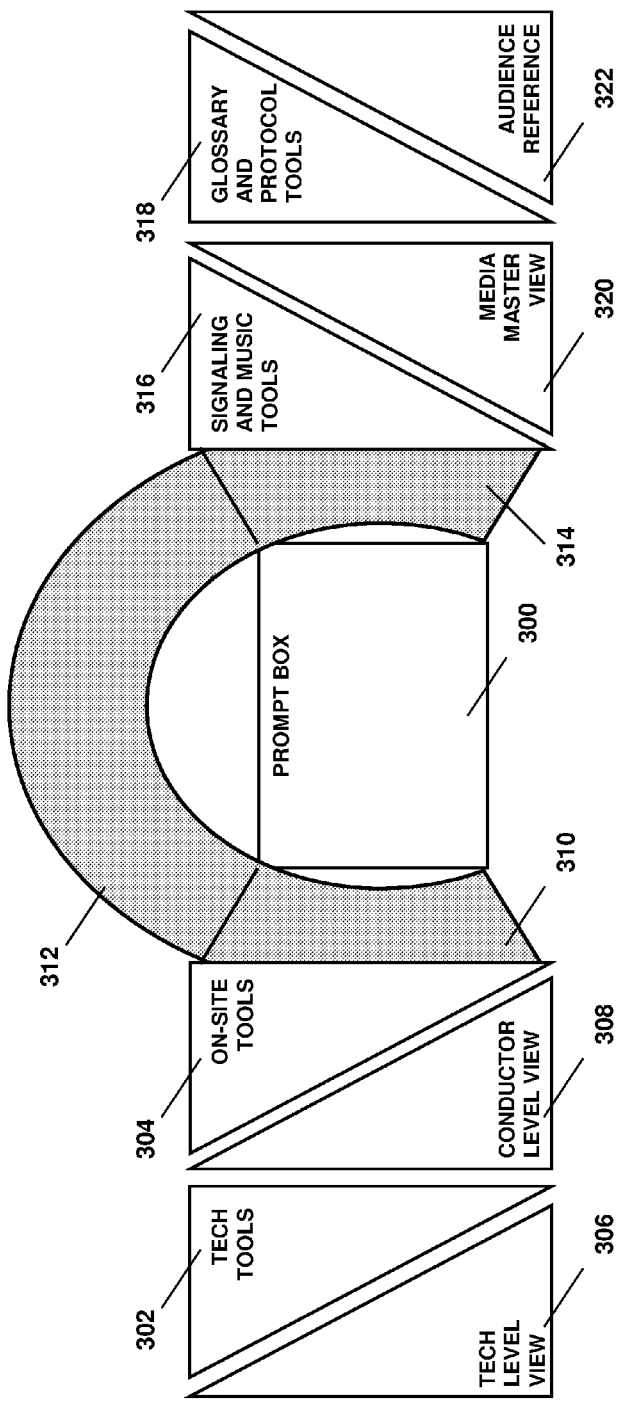
FIG. 11 is the group to group collaborative interface prompt box for management of signals, protocols and tools for group to group upstream/downstream interaction.

Turning to FIG. 11, a group to group collaborative interface prompt box 300 is depicted. The following description of the tool sets should be understood to link back to the visualization tablets referred to in FIG. 9. The prompt box tools may be thought of as the implementation of the planning and development of the visualization tablets.

The prompt box 300 is a portion of the user interface for communication with other sites or participant groups. The prompt box 300 includes such functions as discreet channels, chat programs, video messaging, and a collection of prompts, signals and protocols which function as communication tools for coordinating a range of collaborative functions. These functions may include methods for developing collaborative initiatives and enhancing communication processes.

This tool set also provides conduits for discussion and interaction "off screen" before, during and after an event. Use of these tool sets function at different levels of interactivity, allowing, for example, producers or other individuals involved in the production of an event, to be able to select games, graphic elements, audio and video content and other elements useful for facilitating and enhancing group to group interaction.

Group Interface: Media Initiative Development—A key function of the prompt box 300 is the ability for multiple users in multiple sites to collaboratively develop a media initiative. In the preferred embodiment of this functionality, users will collectively propose types of games, or propose themes for interaction or discuss the question of the inclusion of a specific media stream in an upcoming event.

Tools for managing a given proposal and the interaction required to facilitate are modeled similarly to that of a a "wiki." This form of collaborative tool set will allow multiple participants to work together to develop initiatives for upcoming events, including steps in the creative or administrative process required for a multi-site event with "upstream/downstream" collaborative media involving multiple participants.

The eight triangles to the left and right of the prompt box 300 are divided into four pairs of functionalities corresponding to four production roles: (left to right) Technical; Conductor; Media Master and Audience Referee. A greater or smaller number of such functionalities may be included in practical use of prompt box tool set.

FIG. 11 is presented as an example configuration. Specifically, on the left above are the tech tools which correspond to the technician's view level below 302 and 306, respectively. To the right of this is to be found the on-site tools above and the on-site host or conductor's view level below, 304 and 308, respectively. To the immediate right of the prompt box 300 is the signals and music tools above and the media master view level below 316 and 320 respectively. On the far right are the protocol tools above and the audience referee view level below, 318 and 322 respectively.

Beginning on the left of FIG. 11 is to be found the tech tools 302. Use of this technical tool set provides technicians with the ability to manage, for example, remote movie theatre screens or other remote site screens, projection or displays and other components of the production platform discussed in reference to FIG. 2. Use of the technical tools would allow mutual control of equipment set up at each of two or more sites.

For example, at two separate opera theatres, both have been equipped with the big game console and other group to group production platform components. Both opera theatres have also been set up to use a silver scrim screen. The silver scrim screen is translucent for those performers who are lit as they are positioned behind it; and it is reflective for any video (or other) projection striking it from the front. Therefore, those in the two opera theatres observing the silver scrim screen would see both groups of local live participants (behind the silver scrim screen) and the remote participants (projected on the front of the scrim screen) as a single "image sandwich."

The control functions in this prompt box technical tools frame would be used to manage a projected video image on the silver scrim screen of a live individual or group participating from a remote site and communicate with the stage technicians in both opera theatres to coordinate theatre lighting. This technique can be expanded to include multiple sites at once and it is an example of how the tech tools 302 would be used to manage remote movie theatre screen or other remote site screens.

To the right of the tech tools 302, is the on-site tools 304. This is the portion of the group to group collaborative interface prompt box that is used to manage on-site logistics, such as preparing groups (or teams) at multiple sites to be staged and ready for the "stadium hop" onto a main screen visible to those audience members participating in events occurring at multiple sites.

Functionalities in the on-site level view allow on-site host or "conductor" to coordinate local group actions. An example of use of this component of the invention would be found in a on-site host or conductor's interaction with fans at a given stadium, who are interacting with a graphic or video feed shown on the large video monitor to engage in a group to group "virtual tug of war." On-site hosts, or conductors at both sites would be able to use their on-site level view to coordinate timing of groups. These groups could employ use of their cell phones (or other devices) to select the keypad corresponding with a desired outcome as they view and attempt to influence the images on the large video monitor.

Those participating from outside of the main stadium where this is occurring have access to a duplicate media feed, which replicates for them what is being seen on the stadium video monitor. These remote participants are able to also use their cell phone (or other mobile device) to participate in the group to group multi-site tug of war. As a reward for "winning" a contest between different venues, access to a particular graphic, avatar or other mechanism may be made available by the on-site host, or conductor, whereby one group may, temporarily "win" control of the next group to group game to be played or may have access to presentation of a particular "we win" avatar, or graphic.

Another example of use of the on-site tools would include coordination of deliveries and other logistics required to prepare a multi-site banquet, or "virtual picnic." In such a case, the on-site host, or conductor, could use the organizational tools in the on-site tools 304 to plan and to follow-up on preparations needed so that sites could coordinate meals or banquets taking place in multiple sites simultaneously.

Below the tech tools, 302, is the technical level view 306. In a large scale multi-site event, the use of the technical level view by the technical group may be considered the most complete access to all visualization tools. The technical operations team is responsible for, among other components, facilitation of all technology during a multi-site event, ranging from the underlying connectivity to management of media and production feeds.

As distinct from the main groups who are using the prompt box 300, this technical level view 308 provides technicians with their own discreet channels for interaction between engineers and technicians as the manage and support upcoming or on-going events. This technical level view 308 allows technicians to configure the monitors and communication channels essential to the success of a given initiative. This includes task bars and prompts for, as an example, bandwidth traffic and other connectivity issues.

Below the on-site tools 304 is the on-site host, or conductor level view 308. The on-site host, or conductor may be thought of as part producer, part master of ceremonies and part ring master. This on-site host, or conductor level view 308 allows participant groups or an individual to configure the information flow required for successful coordination of an upcoming or on-going event. As an example, if a performance occurring between multiple sites required pyrotechnic effects to occur on precise cues (as with Tchaikovsky's 1812 Overture) the on-site host or conductor would be able to configure the conductor level view 308 so as to monitor and cue such effects.

Alternatively, in the case of group to group home play using IPTV® capabilities or similar to IPTV®, the home player level view might take the place of the on-site host or conductor. In an example living room to living room event for the grandma birthday, a remote family member might function as the conductor, for example, in charge of when the cake is to be introduced. As use of the group to group interface matures, it is anticipated that more complex events will allow participation by home player groups using in-home IPTV® capabilities or similar to IPTV®, to also be able to interact as multiple remote sites. The group to group interface conductor level view 308 will facilitate participation by these sites in group action mechanisms and other "upstream/downstream" collaborative media interaction.

Surrounding the prompt box 300 is the grey arch which represents the site by site input visualization arch 310, 312, and 314. AS participants in multiple sites coordinate their interactions, those involved in such events require a visualization of the group actions occurring at other sites. 310, 312 and 314 represent three remote sites being monitored in the present FIG. 11. More sites or fewer sites might be monitored as different types of multi-site events are produced. For example, in the earlier described scenario, multiple sites engage in a "virtual tug of war." As this occurs, each site would be able to see a visualization of the cumulative actions of participating groups as they use their cell phones or other devices to "tug" between sites.

To the right of the site by site input visualization arch are the signaling and music tools 316. Communication signaling is required for unified and orderly interaction in preparation for or during event production. Additionally, these tools may be used as part of "in-game" actions and/or within post-production analysis.

The signaling and music tools 316 function of the group to group collaborative interface involves the ability to create, issue, respond to and manage group to group communication signals and to coordinate use of music by collaborating media masters situated at each site. By sharing a set of agreed upon signals with multiple participants in multiple sites, group interaction can move beyond collaboration using text interaction. Such participating groups, even if they speak different languages, may use the present invention to introduce signals of their own and also, they are able to understand other group to group signal sets which are being used within a given interaction. The signaling and music tools 316 are used by the media masters to engage in this process.

To the right of the signaling and music tools 316 is to be found the glossary and protocol tools 318, for use by the audience referee. This aspect of the group to group collaborative interface enhances communication and interaction processes, by, for example, facilitating creation, management and use of a dynamic glossary for group to group communication across multiple sites.

Drawing upon the speak visualization tablet referred to in FIG. 9, this glossary and protocol tool set 318 provides communication and production cues to better facilitate the complex management process of group to group events. This tools set may be thought of as a "Robert's Rules of Order" for multi-site, video-driven, rich media group to group event development and management. The signals 316 and the protocols 318 are intended to work in tandem to keep participant groups clear on where they are in the process (per signals) and what is, or is not supposed to happen next (per protocols.)

Below the signaling and music tools 316 is to be found the media master view level 320. In a multi-site event, production personnel, distinct from technical personnel, work in collaboration to collectively produce and share video, data and other interactive media. Production of these multi-site interactive events requires new production roles such as, for example the media master, responsible for managing multiple media flows from multiple sites and sources.

As distinct from the technical level, the production level use of the group to group collaborative interface by the media master may be thought of as an pipe organ player, capable of bringing in or closing off media and data drawn from a large menu of available resources. At the same time, a media master may configure the media master view level 320 to function as a collective media management tools, which allow large groups to use group action mechanisms to effectively select and direct media feeds by consensus.

To the right of the media master view level 320 is the audience referee view level 322. It is to be understood that a specific group to group interaction may not have a "passive audience," per se, if all attending at each of the sites are, in fact, participants. However, for the purposes of this description, this role has been described as it may function within preparation for and in production of events occurring between multiple large venues and their respective participants or audiences. As such, the audience referee would be responsible for coordinating multiple crowds as they interact and compete from across multiple sites.

For example, during a given event, a participating group recognizes an unexpected turn in collaboration is taking place. At this point the media master at one site provides the overall event participants with a signal that a "Frame Clash" has occurred. A "Frame Clash" may be thought of as a "misunderstanding" occurring during the collaborative process. Use of the "Frame Clash" signal may initiate a series of group protocols, or communication processes, which the audience referee would draw from the group to group collaborative interface. Like a football referee reviewing a playback video of a previous football play to determine the correct "call," the audience referee might "walk" the participants through a set of exchanges and "checks and balances" to help transform the potential "Frame Clash" into a "Rich Point." A "Rich Point" may be thought of as an opportunity for those participating in a collaboration to examine the potential conflict so as to mine it for lessons learned.

Accordingly, a system and method for group to group interface and interaction has been described. It is to be understood that the foregoing description has been made with respect to specific embodiments thereof for illustrative purposes only. The overall spirit and scope of the present invention is limited only by the following claims, as defined in the foregoing description.

What is claimed is:

1. A method for group to group theatrical interaction comprising the steps of:
   group generated planning of the group to group theatrical interaction, said group to group interaction involving at least two members of the group comprised of performing artists, actors, presenters and spectators at different venues and utilizing a collaborative theatrical interface;
   producing the group to group theatrical interaction including the steps of providing a theatrical production platform, including data capture devices and data display devices at each of the venues for each of said at least two members; and
   enabling the group to group theatrical interaction between said at least two members including the steps of capturing data from each venue and displaying data captured from one venue at the other venue and producing interactive prompts at at least one of said venues to facilitate group to group interaction.

2. The method of claim 1, wherein said group further includes spectator attendees, at a venue configured to support a group to group theatrical production.

3. The method of claim 1, further including the initial step of accessing a database for reviewing a previous group to group theatrical interaction involving at least two group members, the data of which is stored in said database.

4. The method of claim 3, further including a final step of archiving in said database the data pertaining to said planning, producing and enabling steps of said group to group theatrical interaction.

5. The method of claim 3, wherein said reviewing step includes review of the stored planning, producing, and enabling steps taken in a previous group to group theatrical interaction.

6. The method of claim 3, wherein said archiving step includes retaining records of the planning, producing and enabling steps taken in said group to group theatrical interaction in a database.

7. The method of claim 1, wherein said group to group theatrical interaction includes the use of at least one of the following:
 audio data;
 video data;
 thermal recognition data;
 motion detection data;
 audio pitch data;
 audio decibel level data;
 group involvement data;
 alternative communication data;
 event outcome data;
 group involvement outcome data;
 on screen graphic data;
 graphic control data;
 event map and event scape data.

8. The system of claim 1, wherein said group includes attendees at one of the following venues:
 a theatre;
 a civic location;
 a cinema;
 a school;
 an university;
 a place of worship;
 a convention center;
 a cruise ship;
 a classroom;
 a film festival;
 a theatrical stage;
 a theme park;
 a stadium;
 an arena;
 a ball park;
 an ice rink;
 a golf course;
 a speedway;
 a retail location;
 a café;
 a mall;
 a natural wonder;
 a fireworks display;
 a national monument;
 a sporting event;
 an event celebrating a national holiday;
 a parade;
 a scenic location;
 a concert;
 an opera;
 a zoological park;
 a botanical garden;
 an art museum;
 a musical event;
 in a residence.

9. The method of claim 1, wherein said planning step includes at least two group members collaboratively performing at least one of the following actions:
 creating a vocabulary of terms;
 creating a listing of individuals involved in the production of the group to group theatrical event;
 creating a sketch of the event;
 creating a flowchart of the event;
 determining how to connect elements used in conducting the group to group theatrical interaction.

10. The method of claim 1, wherein said producing step includes at least two group members collaboratively performing at least one of the following actions:
 selecting a group to group theatrical interaction activity in which said at least two group members take part;
 selecting data capture sources for capturing data from said at least two group members;
 selecting playback sources for display to said at least two group members;
 selecting methods of theatrical interaction for said at least two group members;
 reviewing theatrical signals provided by the participants of one member of said at least two group members;
 responding to theatrical signals provided by the participants of one of said at least two group members.

11. The method of claim 1, wherein said enabling step includes the following steps:
 capturing theatrical interaction data from one of said at least two group members;
 encoding said theatrical interaction data from one of said at least two group members;
 transmitting said theatrical interaction data from one of said at least two group members to the other group members;
 decoding said theatrical interaction data; and
 displaying said theatrical interaction data to said other group members.

12. Use of the method of claim 1 to accomplish at least one of the following:
 control of graphic displays;
 coordinate singing between at least two group members;
 provide access to products for purchase;
 provide access to theatrical media created by one of said at least two group members;
 enable on-line purchases;
 enable devices to purchase products;
 provide devices to create group to group theatrical media;
 enable said at least two group members to take part in a combined picnic;
 enable one of said at least two group members to influence a theatrical outcome;
 produce group-created content;
 enable games involving transportation tracking;
 provide an interactive menu of theatrical activities in which said at least two group members may take part;
 create a theatrical silver scrim screen image;
 archive group to group theatrical interactions;
 review group to group theatrical interactions;
 create an event map;
 create an event scape, made up of multiple event maps.

13. The method of claim 1, further comprising the steps of:
   archiving data created during said group to group theatrical interaction in a database; and
   creating a dynamically-updated reference to said stored data for use in directing individuals to at least one location.

14. The method of claim 13, wherein said dynamically-updated reference is an online user-influenced map.

15. The method of claim 13, wherein said location is a store where a purchase may be made.

16. A system for group to group theatrical entertainment comprising:
   interaction devices for allowing theatrical interaction between at least two members of a group comprised of performing artists, actors, presenters and non-participating spectators at different venues;
   said interaction means including means for producing interactive prompts at at least one of said venues
      data capture devices at each of the venues, connected to said theatrical interaction
      devices, for capturing theatrical interaction data pertaining to said at least two group members;
      transmission devices, connected to said data capture devices, for transmitting theatrical interaction data; and
      playback devices at each venue, connected to said transmission devices, for viewing said theatrical interaction data.

17. The system of claim 16, wherein one of said at least two group members is comprised of attendees at one of the following:
   a theatre;
   a civic location;
   a cinema;
   a school;
   an university;
   a place of worship;
   a convention center;
   a cruise ship;
   a classroom;
   a film festival;
   a theatrical stage;
   a theme park;
   a stadium;
   an arena;
   a ball park;
   an ice rink;
   a golf course;
   a speedway;
   a retail location;
   a café;
   a mall;
   a natural wonder;
   a fireworks display;
   a national monument;
   a sporting event;
   an event celebrating a national holiday;
   a parade;
   a scenic location;
   a concert;
   an opera;
   a zoological park;
   a botanical garden;
   an art museum;
   a musical event;
   in a residence.

18. The system of claim 16, wherein said theatrical interaction data is made up of at least one of the following:
   audio data;
   video data;
   thermal recognition data;
   motion detection data;
   audio pitch data;
   audio decibel level data;
   group involvement data;
   alternative communication data;
   event outcome data;
   group involvement outcome data;
   on screen graphic data;
   graphic control data.

19. The system of claim 16, further comprising reviewing devices at each venue, connected to said theatrical interaction devices, whereby said at least two group members may collaboratively review a previous theatrical interaction.

20. The system of claim 16, further comprising encoding devices connected to said data capture devices and to said transmission devices, for encoding said theatrical interaction data prior to transmission.

21. The system of claim 16, further comprising decoding devices connected to said transmission devices, and to said playback devices for decoding said theatrical interaction data prior to playback.

22. The system of claim 16, further comprising private playback devices connected to said transmission devices, for viewing theatrical interaction control data for producers of said theatrical interaction.

23. A method of group to group theatrical entertainment, comprising the steps of:
   group reviewing of data representing a previous group to group theatrical interaction involving at least two groups, each in a location different from the other;
   group planning a group to group theatrical interaction involving at least two groups including at least one of the following steps:
      setting a schedule of said group to group theatrical interaction;
      determining roles and responsibilities for said group to group theatrical interaction;
      creating, authoring and pre-selecting one or more theatrical interactions in which said at least two groups may take part;
   producing said group to group theatrical interaction, involving at least two groups including at least one of the following steps:
      selecting group to group theatrical interaction data for viewing;
      creating, authoring and selecting at least one theatrical interaction in which said at least two groups may take part;
   enabling said group to group theatrical interaction, including the steps of:
      capturing theatrical interaction data,
      encoding said theatrical interaction data for transmission,
      transmitting said theatrical interaction data,
      decoding said theatrical interaction data, and
      providing playback of said theatrical interaction data; and
   archiving of said group to group theatrical interaction, including the steps of archival storing the data representing the steps of planning, producing and enabling of said group to group theatrical interaction.

24. A system of group to group theatrical entertainment, comprising:

interface devices for enabling interactive theatrical collaboration between groups of performing artists, actors, presenters and non-participating spectators, each present in a location different from the other so as to collaborate to create multi-location theatrical interactions;

theatrical interaction creation devices, connected to said interface devices, for enabling said groups to collaboratively create multi-location theatrical interactions;

production devices, capable of producing interative prompts at at least one location, connected to said interface devices and said theatrical interaction creation devices, for enabling said groups to collaboratively create multi-location theatrical interactions; and data capture devices, connected to said production devices, for enabling said groups to capture data pertaining to an on-going multi-location theatrical interaction.

\* \* \* \* \*